(12) United States Patent
Deluga et al.

(10) Patent No.: US 7,255,848 B2
(45) Date of Patent: Aug. 14, 2007

(54) PRODUCTION OF HYDROGEN FROM ALCOHOLS

(75) Inventors: Gregg A. Deluga, St. Paul, MN (US); Lanny D. Schmidt, Minneapolis, MN (US)

(73) Assignee: Regents of the Univeristy of Minnesota, Minneapolis, MN (US)

( * ) Notice: Subject to any disclaimer, the term of this patent is extended or adjusted under 35 U.S.C. 154(b) by 144 days.

(21) Appl. No.: 10/676,324

(22) Filed: Sep. 30, 2003

(65) Prior Publication Data

US 2005/0260123 A1    Nov. 24, 2005

Related U.S. Application Data

(60) Provisional application No. 60/415,072, filed on Oct. 1, 2002.

(51) Int. Cl.
*C01B 3/02* (2006.01)

(52) U.S. Cl. .................... 423/648.1; 252/373

(58) Field of Classification Search ............. 252/373; 423/648.1
See application file for complete search history.

(56) References Cited

U.S. PATENT DOCUMENTS

| | | |
|---|---|---|
| 3,900,646 A | 8/1975 | Clyde |
| 3,957,685 A | 5/1976 | Heide et al. |
| 3,998,758 A | 12/1976 | Clyde |
| 4,088,607 A | 5/1978 | Weidenbach et al. |
| 4,251,239 A | 2/1981 | Clyde et al. |
| 4,253,302 A | 3/1981 | Asano et al. |
| 4,308,233 A | 12/1981 | Narumiya et al. |
| 4,568,595 A | 2/1986 | Morris |
| 4,810,685 A | 3/1989 | Twigg et al. |
| 4,863,712 A | 9/1989 | Twigg et al. |
| 4,940,826 A | 7/1990 | Font Freide et al. |
| 5,105,052 A | 4/1992 | Font Freide et al. |
| 5,221,464 A | 6/1993 | Durante et al. |
| 5,382,741 A | 1/1995 | Astbury et al. |
| 5,500,149 A | 3/1996 | Green et al. |
| 5,593,935 A | 1/1997 | Golunski et al. |
| 5,597,771 A * | 1/1997 | Hu et al. .................. 502/304 |
| 5,639,929 A | 6/1997 | Bharadwaj et al. |
| 5,648,582 A | 7/1997 | Schmidt et al. |
| 5,654,491 A | 8/1997 | Goetsch et al. |
| 5,663,473 A | 9/1997 | Griffiths et al. |

(Continued)

FOREIGN PATENT DOCUMENTS

CA    2323728 A1 *    1/2001

(Continued)

OTHER PUBLICATIONS

Deluga et al., "Renewable Hydrogen from Ethanol by Autothermal Reforming," *Science*, 2004; 303:993-997.

(Continued)

*Primary Examiner*—Steven Bos
*Assistant Examiner*—Paul Wartalowicz
(74) *Attorney, Agent, or Firm*—Mueting Raasch & Gebhardt, P.A.

(57) ABSTRACT

A process for producing hydrogen from ethanol or other alcohols. The alcohol, optionally in combination with water, is contacted with a catalyst comprising rhodium. The overall process is preferably carried out under autothermal conditions.

47 Claims, 10 Drawing Sheets

U.S. PATENT DOCUMENTS

| | | | |
|---|---|---|---|
| 5,856,585 | A | 1/1999 | Sanfilippo et al. |
| 5,905,180 | A | 5/1999 | Yokoyama et al. |
| 5,980,731 | A | 11/1999 | Kao et al. |
| 5,980,782 | A | 11/1999 | Hershkowitz et al. |
| 5,993,192 | A | 11/1999 | Schmidt et al. |
| 6,072,097 | A | 6/2000 | Yokoyama et al. |
| 6,083,425 | A | 7/2000 | Clawson et al. |
| 6,092,921 | A | 7/2000 | Wentinck et al. |
| 6,123,913 | A | 9/2000 | Clawson et al. |
| 6,126,908 | A | 10/2000 | Clawson et al. |
| 6,197,717 | B1 | 3/2001 | Alexander et al. |
| 6,207,122 | B1 | 3/2001 | Clawson et al. |
| 6,221,280 | B1 | 4/2001 | Anumakonda et al. |
| 6,245,303 | B1 | 6/2001 | Bentley et al. |
| 6,254,807 | B1 | 7/2001 | Schmidt et al. |
| 6,254,839 | B1 | 7/2001 | Clawson et al. |
| 6,365,543 | B1 | 4/2002 | Schmidt et al. |
| 6,387,554 | B1 * | 5/2002 | Verykios ............... 429/17 |
| 6,407,301 | B1 | 6/2002 | Foley et al. |
| 6,436,363 | B1 | 8/2002 | Hwang et al. |
| 6,444,867 | B1 | 9/2002 | Samsel et al. |
| 6,452,061 | B1 | 9/2002 | Schmidt et al. |
| 6,455,597 | B2 | 9/2002 | Hohn et al. |
| 6,506,359 | B1 * | 1/2003 | Maruko ............... 423/648.1 |
| 6,548,447 | B1 | 4/2003 | Yokoyama et al. |
| 6,605,376 | B2 * | 8/2003 | Verykios ............... 429/17 |
| 2001/0009653 | A1 | 7/2001 | Clawson et al. |
| 2001/0027258 | A1 | 10/2001 | Hohn et al. |
| 2002/0009408 | A1 | 1/2002 | Wieland et al. |
| 2002/0087042 | A1 | 7/2002 | Schmidt et al. |
| 2003/0060364 | A1 * | 3/2003 | Anzai et al. ............ 502/304 |
| 2004/0014600 | A1 | 1/2004 | Fukunaga |

FOREIGN PATENT DOCUMENTS

| | | |
|---|---|---|
| EP | 0303429 A2 | 2/1989 |
| EP | 0576096 A2 | 12/1993 |
| EP | 0640559 A1 | 3/1995 |
| EP | 1043271 A1 | 10/2000 |
| EP | 0922011 B1 | 7/2001 |
| EP | 1118583 A2 | 7/2001 |
| EP | 1109876 B1 | 7/2003 |
| EP | 1007472 B1 | 9/2003 |
| FR | 1379027 | 11/1964 |
| GB | 1067957 | 5/1967 |
| JP | 2001-080904 | 3/2001 |
| JP | 2001-089108 | 4/2001 |
| WO | WO96/13475 | 5/1996 |
| WO | WO96/33149 | 10/1996 |
| WO | WO97/26987 | 7/1997 |
| WO | WO97/29062 | 8/1997 |
| WO | WO98/08771 | 3/1998 |
| WO | WO99/35082 | 7/1999 |
| WO | WO99/61369 | 12/1999 |
| WO | WO 00/14180 | 3/2000 |
| WO | WO 01/32556 A1 | 5/2001 |

OTHER PUBLICATIONS

"Homogenous-heterogeneous combustion: Thermal and chemical coupling," Abstract, DOE Contract No. FG02-88ER13878, 2 pgs.

Aupretre et al., "Le vaporeformage catalytique: Application a la production embarquee d'hydrogene a partir d'hydrocarbures ou d'alcools," *Ann. Chim. Sci. Mat.*, 2001, 26(4):93-106 (with English language abstract).

Bodke et al., "The Effect of Ceramic Supports on Partial Oxidation of Hydrocarbons Over Noble Metal Coated Monoliths," *Journal of Catalysis*, 1998; 179:138-149.

Bodke et al., "High Selectivities to Ethylene by Partial Oxidation of Ethane," *Science*, 1999; 285:712-715.

Bodke et al., "Oxidative Dehydrogenation of Ethane at Millisecond Contact Times: Effect of $H_2$ Addition," *J. Catalysis*, 2000; 191:62-74.

Brown, "A comparative study of fuels for on-board hydrogen production for fuel-cell-powered automobiles," *Int. J. Hydrogen Energy*, 2001, 26:381-397.

Burch et al., "Investigation of the reactions of acetaldehyde on promoted rhodium catalysts," *Applied Catalysis A: General*, 1992; 88:61-76.

Cavallaro et al., "Ethanol steam reforming in a molten carbonate fuel cell. A preliminary kinetic investigation," *Int. J. Hydrogen Energy*, 1996; 21(6):465-469.

Cavallaro, "Ethanol Steam Reforming on $Rh/Al_2O_3$ Catalysts," *Energy & Fuels*, 2000, 14:1195-1199.

Chornet et al., "Harnessing hydrogen," *Nature*, Aug. 29, 2002; 418:928-929.

Cohn et al., "Onboard plasmatron generation of hydrogen for extremely low emission vehicles with internal combustion engines," *Int. J. Vehicle Design*, 1996; 17(5/6):550-561.

Cordi et al., "Transient oxidation of volatile organic compounds on a $CuO/Al_2O_3$ catalyst," *Applied Catalysis B: Environmental*, 1997; 14:23-36.

Cortright et al., "Hydrogen from catalytic reforming of biomass-derived hydrocarbons in liquid water," *Nature*, Aug. 29, 2002; 418:964-967.

Dietz III et al., "Partial Oxidation of $C_5$ and $C_6$ Alkanes over Monolith Catalysts at Short Contact Times," *Journal of Catalysis*, 1996; 176:459-473.

Fatsikostas et al., "Steam reforming of biomass-derived ethanol for the production of hydrogen for fuel cell applications," *Chem. Comm.*, 2001; 851-852.

Fishtik et al., "A thermodynamic analysis of hydrogen production by steam reforming of ethanol via response reactions," *Int. J. Hydrogen Energy*, 2000; 25:31-45.

Freni, "Rh based catalysts for indirect internal reforming ethanol applications in molten carbonate fuel cells," *Journal of Power Sources*, 2001; 94:14-19.

Galvita et al., "Synthesis gas production by steam reforming of ethanol," *Applied Catalysis A: General*, 2001; 220:123-127.

Goetsch et al., "Microsecond Catalytic Partial Oxidation of Alkanes," *Science*, 1996; 271:1560-1562.

Gomez et al., "Kinetic Study of Partial Oxidation of Ethanol over VMgO Catalyst," *Ind. Eng. Chem. Res.*, 1997; 36:3468-3472.

Hacohen et al., "Driving Cycle Simulation of a Vehicle Motored by a SI Engine Fueled with $H_2$-Enriched Gasoline," *Int. J. of Hydrogen Energy*, 1991; 16(10):695-702.

Henning et al., "Oxidative dehydrogenation of ethane at short contact times: species and temperature profiles within and after the catalyst," *Chem. Eng. Sci.*, 2002; 57(14):2615-2625.

Hickman et al., "Synthesis gas formation by direct oxidation of methane over Pt monoliths," *Journal of Catalysis*, 1992; 138:267-282.

Hickman et al., "Synthesis Gas Formation by Direct Oxidation of Methane over Rh Monoliths," *Catal. Lett.*, 1993; 17(3-4):223-237.

Hickman et al., "Steps in $CH_4$ Oxidation on Pt and Rh Surfaces; High-Temperature Reactor Simulations," *AIChE Journal*, 1993; 39(7):1164-1177.

Hickman et al., "Production of syngas by direct catalytic oxidation of methane," *Science*, Jan. 15, 1993; 259:343-346.

Huff et al., "Partial Oxidation of $CH_4$, $C_2H_6$, and $C_3H_8$ on Monoliths at Short Contact Times," *Stud. Surf. Sci. Catal.*, Natural Gas Conversion II, Proceedings of the Third Natural Gas Conversion Symposium, Sydney, Australia, Jul. 4-9, 1993; 81:315-320 (1994).

Ioannides, "Thermodynamic analysis of ethanol processors for fuel cell applications," *Journal of Power Sources*, 2001, 92:17-25.

Jamal et al., "On-Board Generation of Hydrogen-Rich Gaseous Fuels—A Review," *Int. J. Hydrogen Energy*, 1994; 19(7):557-572.

Klein et al., "Catalytic partial oxidation of methane to syngas: staged and stratified reactors with steam addition," *Stud. Surf. Sci. Catal.*, Natural Gas Conversion VI, Proceedings of the Sixth Natural Gas Conversion Symposium, Alaska, Jun. 17-22, 2001; 136:245-250 (2001).

Krummenacher et al., "Catalytic Partial Oxidation of Higher Hydrocarbons at Millisecond Contact Times: Decane, Hexadecane, and Diesel Fuel," 18th North American Catalysis Society Meeting, Cancun, Mexico, Jun. 1-6, 2003; 2 pgs.

Krummenacher et al., "Catalytic partial oxidation of higher hydrocarbons at millisecond contact times: decane, hexadecane, and diesel fuel," *Journal of Catalysis*, 2003;215-332-343.

Lakshmi et al., "Synthesis, Characterization, and Activity Studies of Vanadia Supported on Zirconia and Phosphorus-Modified Zirconia," *Langmuir*, 1999; 15:3521-3528.

Mariño et al., "Hydrogen from steam reforming of ethanol. Characterization and performance of copper-nickel supported catalysts," *Int. J. Hydrogen Energy*, 1998;23(12):1095-1101.

Mariño et al., "Hydrogen production from steam reforming of bioethanol using Cu/Ni/K/γ-$Al_2O_3$ catalysts. Effect of Ni," *Int. J. Hydrogen Energy*, 2001, 26:665-668.

Mazzocchia et al., "Hydrogenation of CO over $ZrO_2$-supported Rh catalysts: kinetic aspects," *Journal of Molecular Catalysis*, 1990; 60:283-294.

Mazzocchia et al., "Hydrogenation of CO over Rh/$SiO_2$-$CeO_2$ catalysts: kinetic evidences," *Journal of Molecular Catalysis A: Chemical*, 2001; 165:219-230.

O'Connor et al., "High yields of synthesis gas by millisecond partial oxidation of higher hydrocarbons,"*Catal. Lett.*, 2000; 70:99-107.

Otsuka et al., "The Partial Oxidation of Light Alkanes ($CH_4$, $C_2H_6$, $C_3H_8$) Over B-P Mixed Oxides," *Stud. Surf. Sci. Catal.*, Natural Gas Conversion, Proceedings of the Natural Gas Conversion Symposium, Oslo, Aug. 12-17, 1990; 61:15-23 (1991).

Pestryakov et al., "Physicochemical study of active sites of metal catalysts for alcohol partial oxidation," *Journal of Molecular Catalysis A: Chemical*, 2000; 158:325-329.

Rampe et al., "Hydrogen generation from biogenic and fossil fuels by autothermal reforming," *Journal of Power Sources*, 2000; 86:536-541.

Su et al., "Heterogeneous Partial Oxidation of Light Alkanes," Abstracts of Papers, 224th ACS National Meeting, Boston, MA, 2002; 3 pgs.

Tamman, "Zur Rekristallisation von Metallen und Salzen," *Anorg. Allg. Chem.*, 1923; 126:119-128.

Traxel et al., "Partial Oxidation of methanol at millisecond contact times," *Applied Catalysis A: General*, 2003; 244:129-140.

Vasudeva et al., "Steam reforming of ethanol for hydrogen production: thermodynamic analysis," *Int. J. Hydrogen Energy*, 1996; 21(1):13-18.

Vickers et al., "PLOT Column Considerations for the Gas Chromatographic Analysis of Ozone Precursors," *J&W Scientific*, Aug. 1998:9 pgs.

Wang et al., "Study on the partial oxidation of ethanol to hydrogen in the presence of Ni-Fe catalyst," *Wuii Huaxue Xuebao* (*Acta Physico-Chimica Sinica*), 2002, 18(5):426-431; with English language abstract and translation, 18 pgs.

Beal, "News: Team engineers hydrogen from biomass" [online]. University of Wisconsin-Madison, Aug. 28, 2002 [retrieved on Oct. 24, 2005]. Retrieved from the Internet:<URL:http:www.news.wisc.edu/story.php?get=7766>; 2 pgs.

"Lightweight Valve Train Materials," Report based on research conducted under DOE Cooperative Agreement DE-FC05-97OR22579, U.S. Dept. of Energy, Metals and Ceramics Division, Heavy Vehicle Propulsion Materials Program Quarterly Progress Report, Oak Ridge National Laboratory, Oak Ridge, TN (Jan.-Mar. 2005) 10 pages.

Tamman et al., "Zur Rekristallisation von Metallen und Salzen," *Zeitschrift für Anorganische und Allgemeine Chemie*, 1923; 126:119-128 (11 pgs), and English translation (11 pgs).

\* cited by examiner

PRODUCTION OF HYDROGEN FROM ALCOHOLS

CONTINUING APPLICATION DATA

This application claims the benefit of U.S. provisional patent application Ser. No. 60/415,072, filed Oct. 1, 2002, which is incorporated herein by reference in its entirety.

STATEMENT OF GOVERNMENT RIGHTS

The present invention was made with support by the United States Department of Energy, Grant No. DE-FG02-88ER13878. The government may have certain rights in this invention.

BACKGROUND

Recent advancements in fuel cell technology have spurred an interest in converting alcohols into hydrogen rich gas streams, on a small scale and up to industrial scale. Such technology enables one to convert a non-toxic liquid to hydrogen to feed fuel cells. There is also an interest in converting alcohol/water mixtures, for example ethanol and water, such as sugar from biomass fermentation, directly into electricity.

Catalytic steam reforming of alcohols is a well-known process for producing a hydrogen rich gas stream. This is particularly useful for providing energy to fuel cells. Reforming is highly endothermic, therefore, requiring significant energy input, by using a portion of the fuel to be converted, to drive the reaction forward. Reforming also requires a relatively long catalyst contact times, on the order of seconds, which requires significant equipment investment.

To produce hydrogen by steam reforming, high temperature heat input is primarily required at two process steps. First, sufficient steam at high temperature and high pressure must be generated for mixing with an alcohol feed gas. Second, the steam reforming of the steam and alcohol mixture must take place at relatively high temperatures and pressures through a bed of solid catalyst. The equipment needed for these two heat transfers at high temperature and high pressure is necessarily quite expensive. The equipment for steam reforming is also costly because it must be adapted to permit the changing of the solid catalyst when the catalyst is spent or poisoned. Heat sources appropriate for the above two process steps are typically provided by fired heaters at high, continuing utility costs, also with high fluegas $NO_x$ production consequential to the high temperatures required in the furnace firebox.

The production of hydrogen by partial oxidation, on the other hand, may be considered a desirable alternative to steam reforming, since it overcomes certain problems encountered in the production of hydrogen by steam reforming. Partial oxidation is an exothermic reaction that can be represented by the reaction of, for example, ethanol with oxygen as follows:

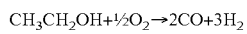

$$CH_3CH_2OH + \tfrac{1}{2}O_2 \rightarrow 2CO + 3H_2$$

As the reaction is exothermic, the expense of providing heat to the reaction is reduced.

However, present limitations to the successful use of partial oxidation of alcohols for the production of hydrogen include the possibilities of flames, carbon formation, excessive or total combustion, and dehydrogenation of the alcohol. Thus, a need exists for a process that overcomes at least some of these problems.

SUMMARY OF THE INVENTION

The present invention provides for the partial oxidation of alcohols to yield products including hydrogen. Preferably this occurs in a manner that provides good selectivities of products and substantially limits or eliminates adverse consequences of a partial oxidation reaction, such as flaming, carbon formation, and excessive combustion. The present invention provides processes for the production of hydrogen from a feed gas that includes at least one alcohol, and optionally water, by contacting the feed gas with a catalyst under specified conditions which include, but are not limited to, feed gas vaporization temperature, flow rates of the reactants, and temperature of the reactor in which the reaction takes place.

In one aspect, the present invention provides a process for the production of hydrogen that includes contacting a composition including at least one alcohol that includes at least 2 carbon atoms with oxygen and a stratified catalyst under conditions effective to produce hydrogen.

In another aspect, the present invention provides a process for the production of hydrogen including: providing a feed gas including at least one alcohol that includes at least 2 carbon atoms; providing a catalyst having a backface; and contacting the feed gas with the catalyst under conditions effective to produce hydrogen; wherein the backface of the catalyst is at a temperature of at least about 300° C. after contact with the alcohol.

In a further aspect, the present invention provides a process for the production of hydrogen including providing a feed gas that includes at least one alcohol that includes at least 2 carbon atoms; providing a catalyst; and contacting the feed gas with the catalyst under conditions effective to produce hydrogen; wherein the residence time of the feed gas over the catalyst is no greater than about 100 milliseconds (ms).

The present invention additionally provides a process for the production of hydrogen including: providing a feed gas including at least one alcohol including at least 2 carbon atoms; providing a catalyst; and contacting the feed gas with the catalyst under conditions effective to produce hydrogen; wherein the overall process occurs under autothermal conditions.

In yet another aspect of the invention, a process for the production of hydrogen is provided including providing a feed gas including at least one alcohol including at least 2 carbon atoms; providing a stratified catalyst; and contacting the feed gas with the stratified catalyst under conditions effective to produce hydrogen.

BRIEF DESCRIPTION OF THE DRAWINGS

FIG. 6(a) shows the backface temperature of the catalyst at the various C/O ratios. FIG. 6(b) shows the conversion of the reactants for the three concentrations of ethanol studied (100 mole percent, 75 mole percent, and 50 mole percent).

FIG. 7(a) shows the selectivities to CO (top 3 lines of the plot) and to $CO_2$ (bottom 3 lines of the plot). FIG. 7(b) shows the selectivites to $H_2$ (top 3 lines of the plot) and $H_2O$ (bottom 3 lines of the plot).

FIG. 9(b) shows the conversion of ethanol and oxygen in reactions using the non-stratified and the stratified catalysts at the flow rates providing 6 SLPM.

FIG. 10(a) shows the selectivities to CO to $CO_2$. FIG. 10(b) shows the selectivites to $H_2$ and $H_2O$.

FIG. 11(a) shows the selectivites for the minor products using a non-stratified catalyst. FIG. 11(b) shows the selectivites for the minor products using a stratified catalyst.

DETAILED DESCRIPTION OF CERTAIN EMBODIMENTS

Figure 1:
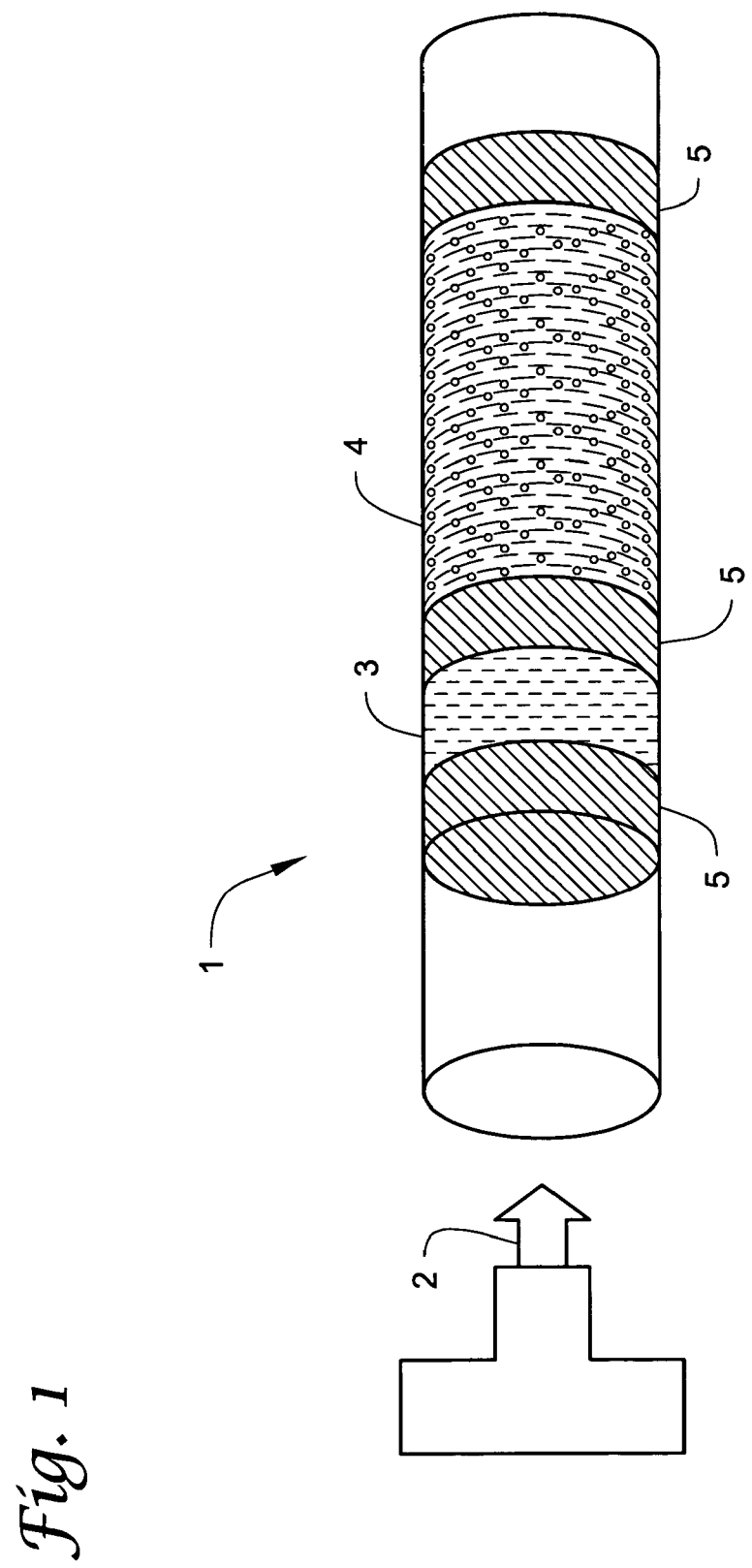
FIG. 1 Representative apparatus for partial oxidation of alcohol including the addition of the water-gas shift reaction using a stratified catalyst.

The present invention provides a process and apparatus for the production of hydrogen from at least one alcohol including at least 2 carbons, typically by partial oxidation.

The alcohol is typically present in a composition at a concentration of at least about 7 mole percent. Alternatively, the concentration may be expressed in weight percent, the alcohol typically being present in a concentration of at least about 15 weight percent, based on total weight of the composition, more typically, at least about 25 weight percent, based on total weight of the composition. Preferably, the alcohol is present in the composition at a concentration of at least about 50%, more preferably at least about 70%, and even more preferably, at least about 75%. Further, the alcohol may be present in a concentration of no more than about 100 weight percent. That is, as used herein, a composition including at least one alcohol is understood to include a composition wherein the composition includes a single alcohol component, as well as a composition of one or more alcohols optionally in combination with additional components. Such additional components may include water. Additionally, the composition may further comprise oxygen.

By the process of the present invention, at least one alcohol including at least 2 carbons, in a feed gas is contacted with a catalyst under conditions effective to produce hydrogen. Alcohols useful in the present invention are understood to be an organic compound that includes at least one hydroxyl group (—OH). As used herein, an "organic compound" includes, but is not limited to, a hydrocarbon compound with optional elements other than carbon and hydrogen, such as oxygen, nitrogen, sulfur, and silicon, that is classified as an aliphatic compound, cyclic compound, or combination of aliphatic and cyclic groups (e.g., alkaryl and aralkyl groups) within any one compound. The term "aliphatic compound" means a saturated or unsaturated linear or branched hydrocarbon compound. This term is used to encompass alkanes, alkenes, and alkynes, for example.

The term "cyclic compound" means a closed ring hydrocarbon compound that is classified as an alicyclic, aromatic, or heterocyclic compound. The term "alicyclic compound" means a cyclic hydrocarbon having properties resembling those of aliphatic compounds. The term "aromatic compound" or "aryl compound" means a mono- or polynuclear aromatic hydrocarbon. The term "heterocyclic compound" means a closed ring hydrocarbon in which one or more of the atoms in the ring is an element other than carbon (e.g., nitrogen, oxygen, sulfur, etc.).

Additionally, organic compounds of the present invention may be substituted with, but not limited to, O, N, Si, or S atoms, for example, in the chain (as in an alkoxy group) as well as carbonyl groups or other conventional substitutions.

While the present process is suitable for use with a feed gas including any alcohol, as defined herein, hydrogen may advantageously be produced using alkanols, particularly ethanol. Additionally, the feed gas may include one or more reactive gases and/or nonreactive gases. Preferably, the feed gas also includes nitrogen, oxygen, or a mixture thereof (e.g., air). Under certain conditions the product gases can also include CO, $CO_2$, $H_2O$, methane, ethane, ethene, ethylene, and acetaldehyde.

According to the processes of the present invention, hydrogen is produced in the form of synthesis gas (also known as syngas, which is $H_2$ and CO), with other major products typically being $CO_2$ and $H_2O$, and typical minor products being methane, ethane, ethane, acetaldehyde, and ethylene. Preferably, the products are provided in millisecond contact times with the catalyst. Conversion of the alcohol may occur in amounts up to about 100% with 3 moles of hydrogen typically produced per mole of alcohol consumed. Additionally, hydrogen to CO ratios in the product gases are typically no less than 1 to 1 hydrogen to CO, and may be as high as 50 to 1 hydrogen to CO. The present process is advantageous in that it may be designed or "tuned" (that is, reaction conditions, such as carbon to oxygen ratios, flow rates, etc.), may be selected to provide the desired products and/or selectivities. Additionally, the present process is scalable, suitable for production of energy from small scale to industrial scale.

Significantly, the process of the present invention provides a procedure for production of relatively high selectivites of hydrogen with significant control over and reduction of certain known disadvantageous occurrences encountered during a partial oxidation reaction, such as flaming, combustion of the reactants, dehydrogenation of the alcohol, and carbon formation. The alcohol, optionally in the presence of water, is initially heated to a temperature that will produce a vapor. This temperature is typically at least about room temperature (i.e., about 25° C.), preferably at least about 130° C., and typically is no greater than about 200° C., more preferably no greater than about 160° C. prior to contact with the catalyst.

Once the alcohol composition is vaporized, the reaction proceeds autothermally. That is, once the reactants are in the gas phase, the exothermic reaction provides the required energy for the reaction to proceed to completion.

The alcohol, for example ethanol, is typically mixed with a carrier gas, which may include oxygen. Preferably, if oxygen is present, substantially all of the oxygen introduced into the reactor is consumed in the partial oxidation step. The oxygen may be provided by any suitable "oxygen-containing oxidant gas" which term is used to include air, air enriched with oxygen, oxygen and/or oxygen mixed with other inert gases, such as nitrogen, argon, helium, xenon, radon, and krypton, for example, to provide a feed gas. The oxygen is preferably added at a carbon/oxygen ratio of at least about 0.2:1 carbon to oxygen, and preferably no greater than about 1.99:1 carbon to oxygen, including the oxygen from both the oxygen-containing gas and any oxygen present in the alcohol.

The feed gas comprising the alcohol is typically contacted with a catalyst of the present invention for a residence time of at least about 0.01 milliseconds (ms), preferably at least about 0.01 ms, more preferably at least about 0.1 ms, and even more preferably, at least about 1 ms. The residence time is typically no greater than about 400 ms, preferably no greater than about 100 ms, and more preferably no greater than about 30 ms. A hydrogen rich, high yield stream is thereby preferably provided. Without being held to any particular theory, it is believed that the short residence time and the feed gas contacting the catalyst at a relatively cold temperature assist in the typically low incidence of flaming, excessive combustion, and carbon formation, all of which may typically and detrimentally occur during typical partial oxidation reactions.

Typical flow rates of the feed gas which are used in the present invention, which provide the preferred residence times, are typically at least about 10,000 $hr^{-1}$ Gas Hourly Space Velocity (GHSV), preferably at least about 300,000 $hr^{-1}$ GHSV. Also, typical flow rates of the present invention are no greater than about 5,000,000 $hr^{-1}$ GHSV, preferably no greater than about 3,000,000 $hr^{-1}$ GHSV.

Advantageously, in contrast to that typically experienced with reactions such as steam reforming, the catalysts of the present invention exhibit substantially no poisoning during the partial oxidation reaction. A preferred catalyst of the present invention includes rhodium. Additionally, several other metals and/or oxides thereof can be advantageously used in combination with rhodium. Herein, the term "metals" is understood to include metals and metalloids. These metals include those selected from Groups 2, 3, 4, 5, 6, 7, 8, 9, 10, 11, 12, 13, and 14 of the Periodic Table, using the IUPAC format which numbers the groups in the Periodic Table from 1 to 18. Preferably, the catalyst includes rhodium and/or oxide thereof, and at least one other metal and/or oxide thereof selected from the group of Ce, Pd, Pt, Ru, Ir, Os, Mg, Cu, Si, Ti, V, Zn, La, Sm, Zr, Hf, Cr, Mn, Fe, Co, Ni, Cu, Y, Sn, Sb, Re, Eu, Yb, and combinations of these metals and/or oxides thereof. More preferably, the catalyst includes rhodium and/or oxide thereof, and at least one other metal and/or oxide thereof selected from the group of Ce, Pt, Pd, Ru, Ir, Al, Zr, and combinations of these metals and/or oxides thereof. Even more preferably, the catalyst includes rhodium and or oxide thereof, and at least one metal and/or oxide thereof selected from the group of Ce, Al, Zr, and combinations of these metals and/or oxides thereof. Yet more preferably, the at least one metal and/or oxide thereof is cerium.

Preferably, rhodium is included in the catalyst in an amount of at least about 10% of the total weight of the metal catalyst. Other metals, if present, are present in a total amount of preferably no greater than about 90%, based on total weight of the metal catalyst. A preferred embodiment of the invention includes a catalyst including a mixture of rhodium and cerium in a 50/50 weight ratio, based on total weight of the metal catalyst. Other preferred embodiments include catalysts including a mixture of rhodium and cerium in ratios of 70%/30% and 80%/20% rhodium to cerium, based on total weight of the metal catalyst.

The source of the metal can be metal salts, such as, for example, nitrates, phosphates, sulfates, chlorides, and bromides. A preferred salt for use with rhodium is rhodium nitrate. If the desired catalyst is a mixture of metals, it is preferable that the salts are compatible. "Compatible salts" are, for instance, salts having the same anion or cation and/or salts that dissolve in the same solvent. Provision of compatible salts may advantageously be accomplished by using the same type of organometallic compound. For example, for a catalyst of rhodium and cerium, rhodium nitrate and cerium nitrate may preferably be used. If, for example, a catalyst of platinum and ruthenium is desired, a mixture of chloroplatanic acid and hexachlororuthenate may advantageously be used.

Alternatively, the metal source can be any method that will deposit or coat a metal on a catalyst support, such as, but not limited to, sputtering, evaporation, CVD deposition, for example.

A multiple catalyst structure, i.e., a "stratified" or "staged" catalyst, such as is shown in FIG. 1, takes advantage of more selective catalysts for hydrogen production. A stratified catalyst is a catalyst that includes layers or strata of catalytic material. This structure allows different reactions to take place in the various strata while the catalyst remains spacially integrated, that is as a single catalyst structure. This type of catalyst is disclosed, for example, in U.S. Pat. No. 5,597,771. In the present invention, as shown in FIG. 1, the portion of the stratified catalyst (1) that first contacts the feed gas (2), i.e., the portion of the stratified catalyst that is "upstream" of the reaction, is believed to predominantly perform the partial oxidation reaction. This first portion (3) of the stratified catalyst (1) may be any metal or oxide thereof selected from the Groups 2, 3, 4, 5, 6, 7, 8, 9, 10, 11, 12, 13 and 14 of the Periodic Table, and preferably at least one metal and/or oxide thereof selected from the group of Ce, Rh, Pd, Pt, Ru, Ir, Os, Mg, Cu, Si, Ti, V, Zn, La, Sm, Zr, Hf, Cr, Mn, Fe, Co, Ni, Cu, Y, Sn, Sb, Re, Eu, Yb, and combinations of these metals and/or oxides thereof. Even more preferably, the first (i.e., upstream) portion (3) of the stratified catalyst (1) may be selected from the group of rhodium, cerium, oxides thereof, and combinations thereof.

It is further believed that the "downstream" portion (4) of the stratified catalyst (1), i.e., the portion of the catalyst that is contacted with the feed gas (2) after the feed gas is contacted by the upstream portion (3) of the catalyst, predominantly provides the water gas shift reaction, discussed below. Furthermore, the stratified catalyst (1) may include more than one portion that is placed downstream. By selecting appropriate catalyst material or materials for placing downstream of the first portion (3) of the catalyst, CO produced from the initial reaction is preferably converted to $CO_2$, thereby increasing hydrogen production. Metals and/or oxides thereof useful in downstream portion or portions of the stratified catalyst (1) typically are selected from the group including Pd, Pt, Rh, Ir, Cu, Co, Zn, V, Ag, Ni, Ce, Zr, Al, Y, oxides thereof, and combinations thereof. More preferably are selected from the group including Pd, Pt, Rh, Ir, Ce, Zr, Al, Y, oxides thereof, and combinations thereof.

The stratified catalyst provides an advantage over certain other catalysts, such as is described in, for example, U.S. Pat. No. 6,387,554 (Verykios). In this patent, a reactor is described which includes multiple small diameter tubes having a partial oxidation catalyst on the internal area of the tubes, and a reforming catalyst on the outer area of the tubes. The heat created from the ethanol reacting on the internal surface (partial oxidation, exothermic reaction) is intended to drive the reforming reaction (endothermic reaction) at the outer surface of the tubes. This catalyst structure is disadvantageous in that it not only requires careful control of the heat generated from the exothermic reaction to drive the endothermic reaction without causing combustion and flaming, but it also requires that the exothermic reaction first provide product, and only that product may be used in the reforming reaction.

The present stratified catalyst substantially avoids the above disadvantages inherent in the type of catalyst structure described in U.S. Pat. No. 6,387,554 by providing a catalyst structure that advantageously performs water-gas shift reaction and partial oxidation in the first portion of the catalyst, and water-gas shift reaction, along with some reforming, in the second portion of the catalyst, thus not requiring as strict control of the partial oxidation reaction and not requiring two separate and consecutive reactions.

A preferred stratified catalyst includes rhodium and/or cerium in the upstream portion and a catalyst material selected from the group of Ce, Zr, Al, Y, Pt, oxides thereof, and combinations thereof in the downstream portion or portions. A more preferred stratified catalyst includes cerium in the upstream portion and includes platinum in the downstream portion or portions of the catalyst. Additionally, one or more portions of the stratified catalyst may be supported by some type of support structure (5), either separating or not separating the portions. Furthermore, the portions may be touching, may include a gap between the faces, and combinations thereof.

The metals and/or oxides thereof chosen as portions of the stratified catalyst are typically present in concentrations of at least about 0.1 weight percent each, and preferably no more than about 10 weight percent each, based on total weight of the metal catalyst. Furthermore, the downstream portion of the catalyst may include one or more separate portions. Each of the downstream portions may be present in the same weight percent as the upstream portion, or may be present in a different weight percent. Preferably the metals and/or oxides thereof are present in a concentration of about 5 weight percent each for each portion, based on total weight of the catalyst.

In the embodiment shown in FIG. 1, the first portion (3) of the stratified catalyst (1) may be, for example, a rhodium/cerium catalyst. A feed gas (2) including the alcohol is vaporized and injected into the first portion of the catalyst at a desired flow rate. For a stratified catalyst including rhodium and cerium in the first portion of the catalyst, the rhodium and cerium may, for example, be present in an amount of about 2.5 weight percent each, based on total weight of the catalyst. The reaction preferably proceeds autothermally in the gas phase. That is, preferably, the process does not typically require the overall addition of heat, as the present invention generates the necessary amount of heat required to drive the reaction, while being able to substantially control flaming and combustion of the reactants. Typically, heat is initially added to the catalyst, after which the energy source is removed. The exothermic reaction becomes the only energy source used to maintain the reaction temperature. Thus, "autothermal" is used herein to mean that once the reactants are in the gas phase, there is typically no need to add heat to drive the reaction forward.

Subsequently placed catalysts may be selected such that they catalyze reactions at temperatures lower than the steady state temperature of the first catalyst, driving the reaction forward.

Typically, the catalyst, which may be a stratified catalyst, generally either includes or is supported on a carrier, i.e., a support structure. This carrier can, for example, be in the form of a metal monolith, a metal foam, a ceramic, a ceramic monolith, a foam ceramic monolith, spheres, porous spheres, pellets, gauze, wires, plates, and a combination of any of these supports, or any other support suitable for the application. Suitable support material includes any material that is able to accept deposited catalytic material and can withstand the reaction temperature.

The catalyst may preferably be deposited on the carrier by coating with a solution or mixture of metal salt, such as, for example, rhodium nitrate. A typical method for depositing a metal salt mixture on a carrier includes a method known as insipid wetness technique. This technique includes providing a salt mixture or solution, allowing the mixture or solution to adsorb onto a carrier by capillary force, and evaporating the solvent. Other methods of depositing catalyst material onto a support include, but are not limited to, sputtering, chemical vapor deposition, metal evaporation, plasma coating, painting, screen printing, ion exchange coating, sol gel coating, and ink jet printing.

A preferred carrier is a monolithic carrier, that is, a carrier of the type that includes one or more monolithic bodies having a plurality of finely divided gas flow passages extending therethrough. Such monolithic carrier members are often referred to as "honeycomb" type carriers and are well known in the art. A preferred form of such carrier is made of a refractory, substantially inert, rigid material that is capable of maintaining its shape and a sufficient degree of mechanical strength at high temperatures, for example, up to about 2,000° C. Typically, a material is selected for the support that exhibits a low thermal coefficient of expansion, good thermal shock resistance, and, though not always, low thermal conductivity. Two general types of material for construction of such carriers are known. One is a ceramic-like porous material that includes one or more metal oxides, for example, alumina, alumina-silica, alumina-silica-titania, mullite, cordierite, zirconia, zirconia-spinal, zirconia-mullite, silicon carbide, etc. A particularly preferred and commercially available material of construction for operations below about 1,000° C. is cordierite, which is an alumina-silica-magnesia material. For applications involving operations above about 1,000° C. an alumina-silica-titania material is preferred. Honeycomb monolithic supports are commercially available in various sizes and configurations. Typically, the monolithic carrier would be of a generally cylindrical configuration (either round or oval in cross section) with a plurality of gas flow passages or regular polygonal cross section extending therethrough. The gas flow passages are typically sized to provide at least about 50, preferably at least about 200 gas flow channels per square inch of face area. Additionally, the gas flow passages are typically sized to provide no more than about 1,200, preferably no more than about 600, gas flow channels per square inch of face area.

Various honeycombed (reticulated) ceramic structures are described in the art: U.S. Pat. No. 4,251,239 discloses a fluted filter of porous ceramic having increased surface area. U.S. Pat. No. 4,568,595 discloses honeycombed ceramic foams with a surface having a ceramic sintered coating closing off the cells. U.S. Pat. No. 3,900,646 discloses ceramic foam with a nickel coating followed by platinum deposited in a vapor process. U.S. Pat. No. 3,957,685 discloses nickel or palladium coated on a negative image ceramic metal/ceramic or metal foam. U.S. Pat. No. 3,998,758 discloses ceramic foam with nickel, cobalt, or copper deposited in two layers with the second layer reinforced with aluminum, magnesium, or zinc. U.S. Pat. No. 4,863,712 discloses a negative image honeycombed (reticulated) foam coated with cobalt, nickel, or molybdenum coating. U.S. Pat. No. 4,308,233 discloses a reticulated ceramic foam having an activated alumina coating and a noble metal coating useful as an exhaust gas catalyst. U.S. Pat. No. 4,253,302 discloses a foamed ceramic containing platinum/rhodium catalyst for exhaust gas catalyst. U.S. Pat. No. 4,088,607 discloses a ceramic foam having an active aluminum oxide layer coated by a noble metal containing composition such as zinc oxide, platinum and palladium.

The foam structure is characterized by the number of pores per linear inch (ppi). Typical foams are produced with at least about 10 pores per linear inch and no more than about 100 pores per liner inch. The ceramic supports employed in the present invention are generally of the type disclosed in U.S. Pat. No. 4,810,685 using the appropriate material for the matrix and are generally referred to in the art and herein as "monoliths."

Generally any organic liquid in which the metal salt is soluble may be used to deposit metals onto the monolith supports. The metals may also be deposited from aqueous solutions using the water soluble salts.

A suitable high surface area refractory metal oxide support layer may be deposited on the carrier to serve as a support upon which finely dispersed catalytic material may be distended. As is known in the art, generally, oxides of one or more of the metals of Groups 2, 3, and 4 of the Periodic Table of the Elements having atomic numbers not greater than 40 are satisfactory as the support layer. Preferred high surface area support coatings are alumina, beryllia, zirconia, baria-alumina, magnesia, silica, and combinations of two or more of the foregoing.

A preferred support includes alumina, more preferably a stabilized, high surface area transition alumina. One or more stabilizers such as rare earth metal oxides and/or alkaline earth metal oxides may be included in the transition alumina. Typically stabilizers, if present, are included in an amount of no less than about 10 weight percent and no greater than about 20 weight percent, based on the total weight of the catalyst and support.

The metal monolith may be prepared as metal foam or sintered particles of metal at high temperature. Monolithic supports may also be made from materials such as nickel or stainless steel by placing a flat and a corrugated metal sheet, one over the other, and rolling the stacked sheets into a tubular configuration about an axis parallel to the corrugations, to provide a cylindrical-shaped body having a plurality of fine, parallel gas flow passages extending therethrough.

Water-Gas Shift

When water is included in the feed gas, it is believed that the product shifts toward increased production of hydrogen according to the water-gas shift reaction:

$$H_2O+CO \rightarrow CO_2+H_2$$

as disclosed in U.S. Pat. No. 6,254,807. When $H_2O$ is fed to the reaction, the product typically shifts to the $H_2$, providing a means to adjust the $CO:H_2$ product ratio. A preferred embodiment includes water in an alcohol-water feed gas mixture present in an amount of about 50 percent water, based on total volume of water and alcohol.

An adverse side reaction, known as reverse water gas shift or methanation, may typically occur with the water gas shift according to the following reaction:

$$2H_2+CO \rightarrow CH_4+O_2$$

Without being held to any particular theory, it is believed that this reaction occurs when a feed gas contacts a catalyst below the equilibrium temperature of the reaction. The water gas reaction is limited by equilibrium and, typically, the catalysts reach equilibrium relatively quickly at a given temperature. Therefore, this reaction may be limited by, for example, using catalyst(s) that catalyze reactions at or above the equilibrium temperature of a reaction. It is, therefore, believed that the catalyst material impacts the occurrence of the reverse water-gas shift reaction. Thus, by selection of catalyst material, it is believed that occurrence of the reverse water-gas shift reaction in the present invention may be reduced.

Partial oxidation of ethanol with water-gas shift has been disclosed in the art (U.S. Pat. Nos. 6,605,376 and 6,387,554, both to Verykios). However, neither of these patents disclose the use of a stratified catalyst, nor do they suggest a catalyst temperature or residence time as described herein. Furthermore, while U.S. Pat. No. 6,605,376 describes the use of partial oxidation of ethanol to produce heat for the reforming reaction, there is no evidence that the conditions disclosed, including the reaction indicated by Formula 2, would provide sufficient heat alone to drive the reforming reaction. The heat generated by the conditions of the present invention, measured as the backface temperature of the catalyst and discussed more fully below, provides sufficient energy to drive the partial oxidation and water-gas shift reactions forward. That is, the process of the present invention is autothermal.

Additionally, the disclosure of Verykios teaches a method for producing hydrogen from partial oxidation using multiple small reaction tubes to provide a distributed flow of small amounts of ethanol, presumably to limit the amount of flaming that may occur with the partial oxidation reaction. The present invention instead advantageously provides control of flaming and combustion through the flow rate/residence time on the catalyst of the reactants.

Furthermore, by controlling the flow rate/residence time of the reactants, which is relatively easily done, the amount of hydrogen produced for a given amount of alcohol reacted is increased or decreased. Under the method of Verykios, on the other hand, to vary the amount of hydrogen produced for a given amount of ethanol, the number of reactor tubes used must physically be changed.

Reaction Apparatus

Figure 2:
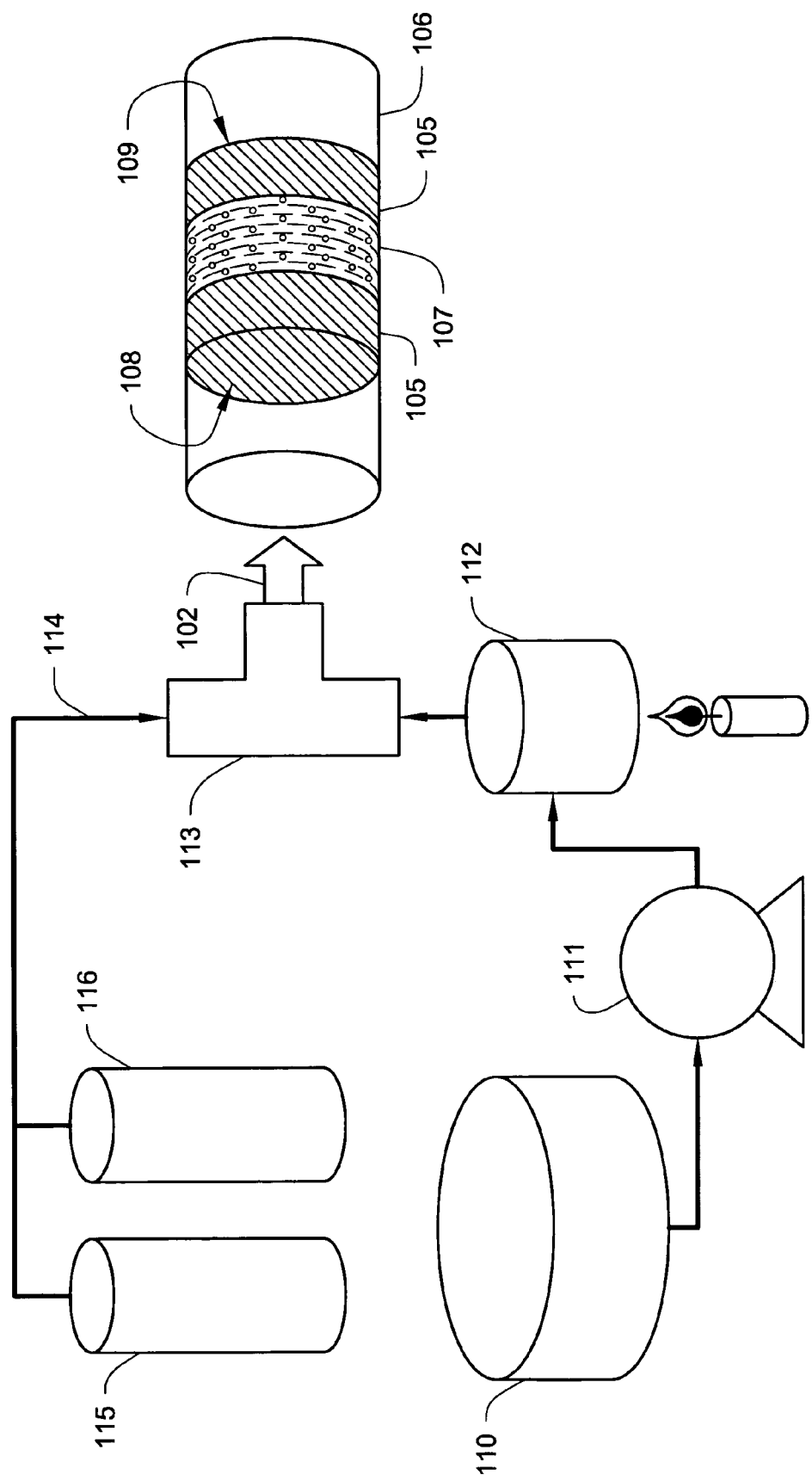
FIG. 2 Representative apparatus and reactions for partial oxidation of ethanol.

The present invention may be carried out using any reactor apparatus which will provide a vaporized feed gas of the invention at the selected temperature and at the selected flow rate to a selected catalyst heated to a selected temperature, as described herein. An exemplary reactor apparatus, as shown in FIG. 2, includes a reactor tube (106) which is typically about 18 millimeters (mm) in inside diameter, and at least 20 mm in outside diameter. Tubes of smaller and larger sizes are also useful, as well as tubes of different wall thicknesses. Additionally, although quartz is a preferred material for the tube because it melts at high temperatures (about 1,500° C.) and is clear, any materials that are resistant to melting at the reaction temperatures and not gas permeable would be acceptable reactor tube materials. A catalyst of the present invention (107) is placed inside the reactor tube (106). The catalyst (107) is placed such that there is a "frontface" (108) that is the "upstream" surface that is first contacted by the feed gas (102) in the reactor, and a "backface" (109) that is the "downstream" surface last contacted by the feed gas in the reactor. Additionally, the catalyst may be supported by some type of support structure (105).

The selected alcohol, optionally including water, comprising the alcohol composition is fed from a source (110) by, for example a pump (111) to a vaporizer (112), such as a heating coil, and then to a mixing chamber (113), such as may be provided by a T-fitting, for example, which allows the gases to be mixed prior to injection into the reactor. In the mixing chamber the vaporized alcohol composition is mixed with one or more carrier gases (114), which may, for example, optionally be reactive (115) or non-reactive (116) to provide a feed gas (102) to the reactor. The feed gas (102) is then fed to the reactor tube (106) including the catalyst (107) at a specified flow rate.

Figure 3:
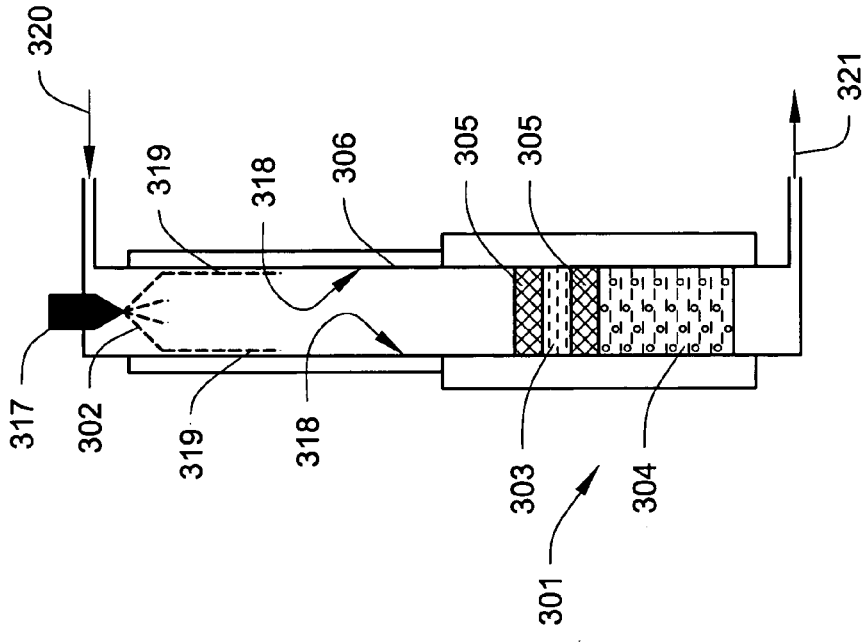
FIG. 3 Representative apparatus for partial oxidation of ethanol using an injector apparatus to vaporize the feed gas.

Another apparatus useful in preferred processes of the invention is a reactor system using an injector system (FIG. 3). This system includes an apparatus for delivery (217) of the alcohol composition (202) in the manner described below, to a reactor (206) that includes walls (218) that, preferably, have been heated to a temperature higher than the alcohol composition vaporization point. The injector system essentially serves the purpose of the pump, vaporizer, and mixing chamber of the basic reactor apparatus, discussed above. The injector apparatus is advantageously used to assist in the rapid heat exchange of the relatively cold feed gas upon contact with the catalyst.

The alcohol composition is delivered to the fuel injector typically at atmospheric pressure, which delivers the alcohol composition to the reactor (206). By delivery in this manner, a film of the alcohol composition (219) is formed on a wall (218) of the reactor, then subsequently vaporized and mixed with an oxygen source (220), such as air, prior to contact with a catalyst (207), which is, optionally, supported by a support structure (205). It is believed that this process substantially avoids combustion of reactants that can typically occur during a partial oxidation reaction. The vaporization and mixing of the alcohol composition and oxygen source to provide the feed gas occurs instantly, for example in less than 10 milliseconds (ms), preferably less than 5 ms, and more preferably less than 1 ms. It then takes the feed gas approximately 10 to 20 ms, depending on the length of the reactor (206) and the flow rate, to travel to the catalyst (207), providing the desired products (221). Thus, by avoiding combustion, a safer reaction is provided and coking of the catalyst may be avoided. Also, by delivering the alcohol composition in this manner, water, which can prevent combustion in the reaction, does not need to be added to the reaction (although for certain embodiments water can be added).

Significantly, the process of the present invention provides a controllable process for the production of relatively high selectivities of hydrogen in the form of syngas by the use of the injector system. Using this system, the alcohol composition is delivered to the reactor, a film is formed on the reactor walls, and vaporized and mixed with the oxygen source prior to contacting the catalyst. The injector apparatus used may be any fuel injector that could be used to deliver a fuel under the conditions described herein, such as an automobile gasoline fuel injector. The flow rate typically is controlled by pressure of tanks holding the reactants and carrier gases, for example, and by the duty cycle (the percentage of time the injector remains open). The duty cycle and the tank pressure determine the fuel flow rates, and the frequency determines how constant the flow rate is, by determining the number of times the injector opens in a second. The higher the frequency, the more continuous the fuel flow. Processes of the invention using this type of fuel injector generally include injectors operated at a frequency of at least about 3 Hertz (Hz). Typically the frequency is no greater than about 30 Hz. Additionally, the duty cycles used in processes of the present invention are typically at least about 1%. Typically duty cycles used are preferably no greater than about 30%.

The injector provides a film of the alcohol composition on the sides of the heated reactor. The film is preferably a thin film of at least about monomolecular thickness. Preferably the film thickness is no greater than about 1,000 microns ($\mu$m), more preferably no greater than about 500 $\mu$m, and most preferably no greater than about 250 $\mu$m.

A preferred injector sprays the fuel in a conical shape, creating a substantially even film on the pre-heated reactor walls. It is believed that this film is significant in the present processes by providing a temperature gradient. Therefore, any fuel delivery method that is able to provide this film on the reactor walls may be used in the present invention, for example, an accurate flow pump, such as a syringe pump, with a conical nozzle. Hence, the fuel delivery method need not necessarily be an injector. Any fuel delivery system may be used, provided it is able to supply the film of fuel on the heated reactor walls in the manner described herein.

Figure 4:
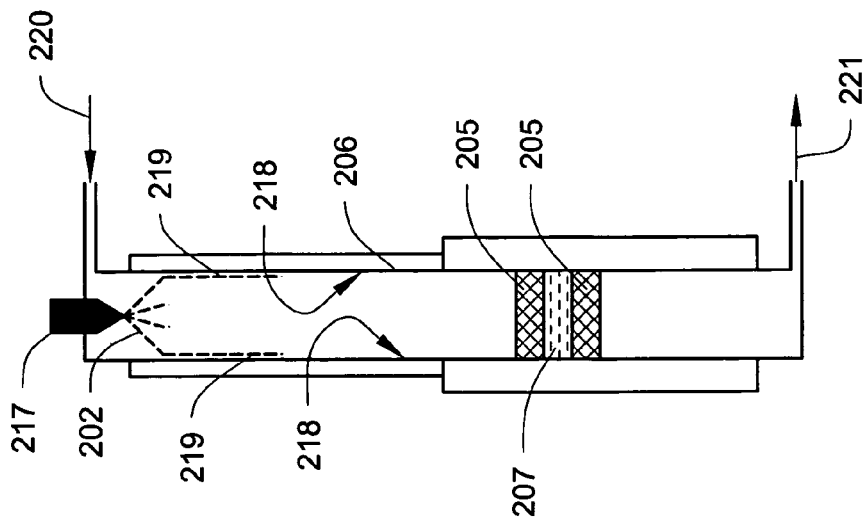
FIG. 4 Representative apparatus for partial oxidation of ethanol using an injector apparatus to vaporize the feed gas and a stratified catalyst.

The above-described injector system may advantageously be used with a stratified catalyst, such as is shown in FIG. 4. The feed gas contacts the first portion (303) of the stratified catalyst, and subsequently contacts the second portion (304) of the stratified catalyst. The portions of the stratified catalyst (301) may optionally be supported by one or more support structures (305).

To provide these preferred contact times for the production of the products, such as syngas, the feed gas typically contacts the catalyst at a flow rate of at least about 0.5 standard liters per minute (SLPM). Additionally, the feed gas preferably contacts the catalyst at a flow rate of no greater than about 20 SLPM.

Figure 5:
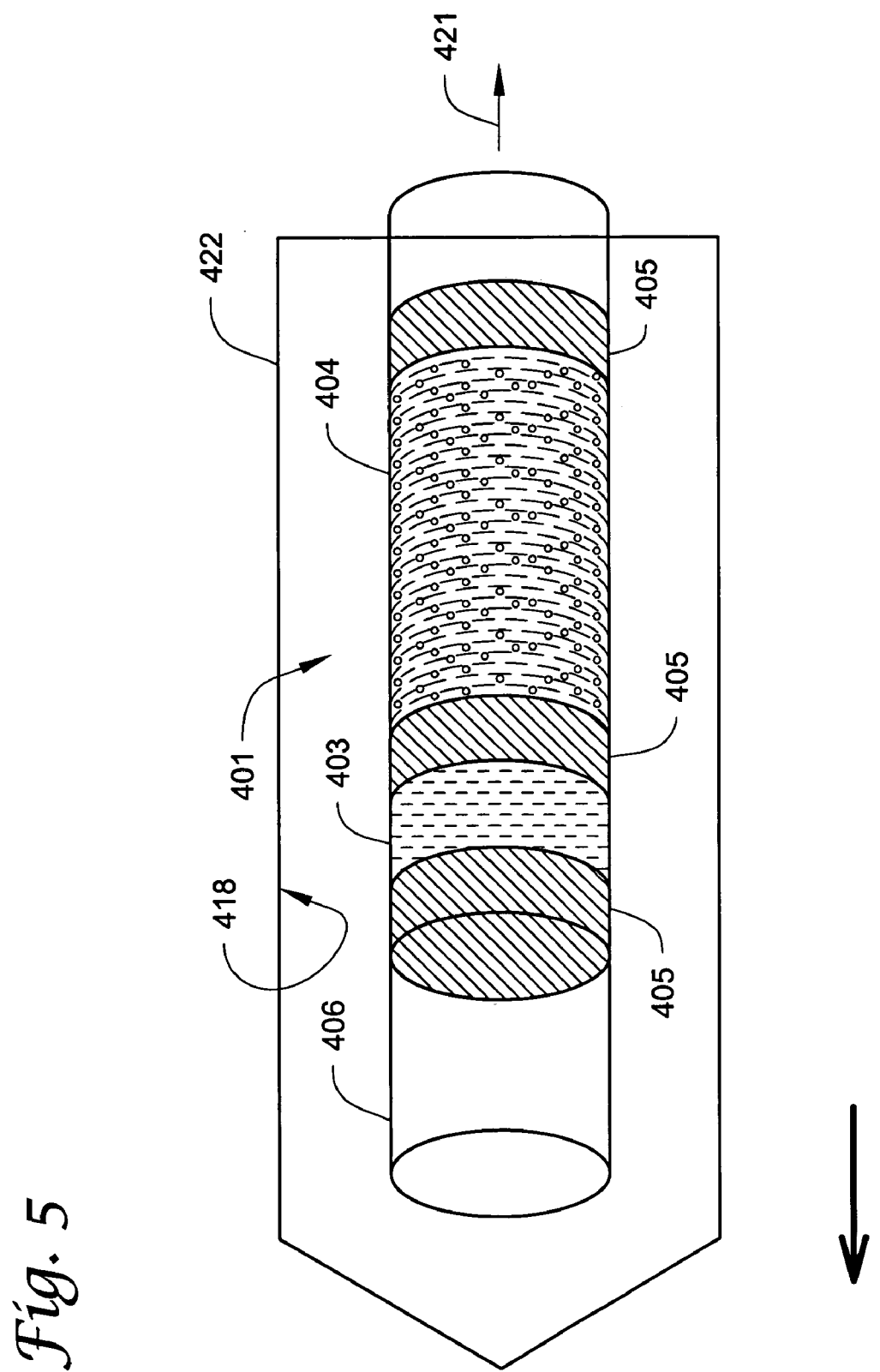
FIG. 5 Representative apparatus for partial oxidation of ethanol using a Coaxial Reactor to vaporize the feed gas and control reaction temperature.

Another preferred embodiment includes the process whereby the reaction takes place in a reactor having a Coaxial configuration. A typical apparatus for this embodiment is shown in FIG. 5. The Coaxial configuration is able to take advantage of excess heat generated from exothermic reactions. It may also accommodate the structure of stratified catalysts. The feed gas is forced into the reactor apparatus and through appropriate catalyst(s).

In a coaxial configuration, a reactor tube (406), which holds the catalyst (401) (the catalyst shown in FIG. 5 being a stratified catalyst, although a non-stratified catalyst may also be used), is provided within an outer tube (422). A thin film of the alcohol composition is sprayed onto the inner wall (418) of the outer tube (422) by any appropriate device that will provide a film of the alcohol composition on the wall. The film flows down the wall of the outer tube (422) in the direction of the arrow, indicated in FIG. 5. An oxygen source, such as air, is introduced into the outer tube (422), mixing with the alcohol composition and providing an exothermic reaction that generates heat, which vaporizes the alcohol composition. The vaporized composition then travels to the stratified catalyst (401) in the reactor tube (406) in a direction moving from the first portion (403) of the stratified catalyst (401) to the second portion (404) of the stratified catalyst (401) to provide the products (421). The catalyst may be any catalyst of the present invention, FIG. 5 exemplifying a stratified catalyst, wherein the first portion of the catalyst (403) and the second portion of the catalyst (404) are optionally supported by an appropriate support structure (405).

Reactor heat is provided autothermally by the heated catalyst(s), that is once the catalyst is initially preheated, preferably no further heat is required in the reaction. The embodiment typically provides rapid heat exchange between the feed gas and the catalysts, and also typically provides control of the reaction temperature.

Typically, the preferred reactor temperatures of any acceptable reactor apparatus (that is, the temperature of the backface of the catalyst after contact with the feed gas) at which partial oxidation of alcohols occurs is at least about 300° C., more preferably at least about 500° C., and most preferably, at least about 800° C. Preferably, reactor temperatures are no greater than about 1,400° C., and more preferably, no greater than about 1,100° C.

EXAMPLES

Basic Apparatus Setup

The basic reactor setup apparatus used in the following examples included a quartz tube about 18 millimeters (mm) in inside diameter, and at least 20 mm in outside diameter. The ends of the tubular reactor had fittings that allowed it to be attached to a stainless steel tubing via SWAGELOCK compression fittings (available from Hydrocomponents & Technologies, Inc., Vista, Calif.). Three inputs were attached to the reactor: a nitrogen gas input, an oxygen gas input and a fuel/water input. The nitrogen and oxygen were controlled by calibrated Brooks mass flow controllers (Brooks model #5850E, available from Brooks Instrument, Hatfield, Pa.). The fuel/water system consisted of an ISCO 500D syringe pump (available from ISCO Industrial Service Co., Bend, Oreg.), a 6 foot (ft), 1/8 inch (in) inside diameter stainless steel coil immersed in an oil bath and heated by a hot plate to about 120° C., and an ISCO Series D syringe pump controller (available from ISCO Industrial Service Co., Bend, Oreg.).

The reactor was assembled by placing a catalyzed monolith between two blank monoliths and wrapping the three monoliths in FIBERFRAX ceramic fiber insulation (McNeil, Inc., Robbinsville, N.J.). The catalyst and blanks were then placed in the center of the quartz tube and hooked up to the SWAGELOCK fitting. Upstream from the SWAGELOCK fitting was a stainless steel T fitting that allowed the mixing of the nitrogen, oxygen and alcohol/water gases, providing the feed gas to the reactor. Reactor systems such as this have been run for at least 4 hours with no degradation in performance.

The reactor was allowed to run for about 30 minutes before a gas sample was taken. The sample was taken with a GASTIGHT syringe (available from Chrom Tech, Inc., Apple Valley, Minn.) and placed into a Hewlett Packard model No. 5890 Gas Chromatograph (GC) for analysis. The GC had a 25 foot, 80/100 mesh packed Haysep D GC column (Alltech Associates, Deerfield, Ill.) and the carrier gas was helium.

The data from the GC was analyzed with the Hpchem software package that accompanies the HP 5890 Gas Chromatograph. The peak heights were converted to mole fraction using the nitrogen peak as a known reference.

Catalyst Preparation

Alfa Asear #1263 rhodium nitrate solution (0.947 grams, available from Alfa Asear, Ward Hill, Mass.) was mixed with 20 milliliters (ml) of deionized water and placed in a petrie dish. Then, an 80 pores per inch (PPI) alumnia monolith, available from ZUES Corporation (Kokomo, Ind.) weighing 2.163 grams (g) was placed in the petrie dish with the metal salt mixture, and the mixture was allowed to adsorb onto the monolith by capillary forces in the high surface area monolith. The water was then allowed to evaporate from the mixture for approximately 1 week. Alternatively, water evaporation may be accelerated by placing the monolith and dish in a vacuum oven. Once the water evaporated, the monolith was heated to about 500° C. in air for four hours.

Rhodium Catalyst with a Feed Gas Including Ethanol.

Example 1

A catalyst of 5 weight percent rhodium, based on total weight of catalyst and support, on an alumina monolith was prepared according to the method described above.

A reactor apparatus, such as is shown in FIG. 2, was assembled as described above and the rhodium catalyst was placed in the reactor. The nitrogen was set to a value of about 1 Standard Liter Per Minute (SLPM) and allowed to flow for 5 minutes to flush the system. The nitrogen was then allowed to continue flowing at a rate of about 1 SLPM. The fuel coil was preheated to about 120° C. and the syringe pump was filled with 200 proof ethanol (Absolute, 200 proof, Aaper Alcohol and Chemical Company, Shelbyville, Ky.). The pump was set to a value of about 5.48 ml/min (2.67 SLPM) and turned on to fill the coil, but did not reach the reactor. The fuel was then turned off.

The catalyst was then preheated to about 250° C. with a Milwaukee model 8977 heat gun (Milwaukee Electric Tool Corporation, Brookfield, Wis.), set to the maximum temperature.

The ethanol fuel line was allowed to flow at a rate of about 2.67 SLPM, then the oxygen was allowed to flow at a rate of about 1.33 SLPM, with the nitrogen continuing to flow at a rate of about 1 SLPM, to produce a C/O ratio in the mixed feed gas of 1:1. The total flow of all the gases was about 5 SLPM. The ethanol/oxygen/nitrogen gas feed was allowed to contact the catalyst in the reactor for a residence time of approximately 0.96 milliseconds (ms).

The catalyst glowed brightly for a few seconds, then came to a steady state bright red color. The backface of the catalyst (the downstream side from the feed), rose slowly to about 500° C., then quickly to about 1,000° C., then decreased and remained at about 960° C. at a steady state throughout the reaction. A layer of FIBERFRAX insulation (McNeil, Inc., Robbinsville, N.J.) approximately 4 inches thick was then placed around the reactor to assist in maintaining the reaction temperature.

The conversion of ethanol to any other carbon containing product was 64% in-out/in-in standard liters per minute (SLPM). The other carbon products in the gas stream were CO (21.5 mole percent), $CH_4$ (3.9 mole percent), $CO_2$ (5.2 mole percent), $C_3H_6$ (3.8 mole percent), and $C_2H_4O$ (5.3 mole percent). Hydrogen was present at 8.6 mole percent, and water was present at 8.2 mole percent.

Example 2

A reaction was performed according to Example 1, except that water was mixed with the ethanol in the fuel feed. The fuel was 70 volume percent ethanol, and was allowed to flow at a rate of about 1.03 SLPM of ethanol and 1.61 SLPM of water. The oxygen flow rate was about 1.23 SLPM. Nitrogen was flowed in an amount to provide a total gas flow of about 5 SLPM. This flow produced a C/O ratio in the mixed feed gas of 0.6:1. The backface temperature of the catalyst was about 1,000° C. and the residence time of the feed gas on the catalyst was about 0.99 milliseconds.

The conversion of ethanol to any other carbon containing product was 89.8% in-out/in-in SLPM (in-out/in-in SLPM defined as units SLPM in minus units SLPM out divided by the units SLPM in). The other carbon products in the gas stream were CO (34.2 mole percent), $CH_4$ (0.5 mole percent), $CO_2$ (8.9 mole percent), $C_3H_6$ (0.2 mole percent), and $C_2H_4O$ (0.2 mole percent). Hydrogen was present at 31.4 mole percent, and water was present at 4.6 mole percent.

Rhodium/Cerium Catalyst with a Feed Gas Including Ethanol.

Example 3

The process was carried out according to Example 1, except that the catalyst included 2.5 weight percent rhodium and 2.5 weight percent cerium, based on total weight of catalyst and support, deposited on an alumina monolith. The catalyst was deposited as described above, using a mixture of 0.435 g rhodium nitrate solution (Alfa Aesar #1263, Alfa Asear, Ward Hill, Mass.) and 0.370 g cerium nitrate (Alfa Aesar #11329, Alfa Asear, Ward Hill, Mass.) with 20 ml deionized water and an alumina monolith weighing 1.987 g.

The backface temperature of the catalyst was about 682° C., and the residence time of the feed gas on the catalyst was about 1.3 milliseconds.

The conversion of ethanol to any other carbon containing product was 98.2% in-out/in-in SLPM. The other carbon products in the gas stream were CO (34.8 mole percent), $CH_4$ (1.0 mole percent), and $CO_2$ (5.4 mole percent). Hydrogen was present at 41.4 mole percent, and water was present at 2.3 mole percent.

Example 4

The process was carried out according to Example 3, except that water was mixed with the ethanol in the fuel feed. The fuel was 50 volume percent ethanol, and was allowed to flow at a rate of about 0.53 SLPM of ethanol and 2.73 SLPM of water. The oxygen flow rate was about 0.74 SLPM. Nitrogen was flowed in an amount to provide a total gas flow of about 5 SLPM. This flow produced a C/O ratio in the mixed feed gas of 0.53:1. The backface temperature of the catalyst was about 630° C. and the residence time of the feed gas on the catalyst was about 1.36 milliseconds.

The conversion of ethanol to any other carbon containing product was 99.8% in-out/in-in SLPM. The other carbon products in the gas stream were CO (29.3 mole percent), $CH_4$ (1.4 mole percent), $CO_2$ (6.6 mole percent), $C_3H_6$ (0.5 mole percent), and $C_2H_4O$ (0.9 mole percent). Hydrogen was present at 32.6 mole percent, and water was present at 2.3 mole percent.

Rhodium/Ruthenium Catalyst on Alumina Monolith with a Feed Gas Including Isopropanol.

Example 5

The process was carried out according to Example 1 with the following exceptions:

The catalyst included 2.5 weight percent rhodium and 2.5 weight percent ruthenium, based on total weight of catalyst and support, deposited on an alumina monolith. The catalyst was deposited as described above, using a mixture of rhodium nitrate and aquapentachlororuthenate in 20 ml deionized water on a 2.039 g, 80 ppi alumnia monolith, available from ZUES Corporation (Kokomo, Ind.).

The fuel reacted was 70 volume percent isopropanol, and was allowed to flow at a rate of about 1.43 SLPM. The oxygen flow rate was about 1.5 SLPM. Nitrogen was flowed in an amount to provide a total gas flow of about 5 SLPM. This flow produced a C/O ratio in the mixed feed gas of 0.51:1. The backface temperature of the catalyst was about 1,042° C. and the residence time of the feed gas on the catalyst was about 0.91 ms.

The conversion of isopropanol to any other carbon containing product was 73.5% in-out/in-in SLPM. The other carbon products in the gas stream were CO (25.9 mole percent), $CH_4$ (0.1 mole percent), and $CO_2$ (8.4 mole percent). Hydrogen was present at 38.2 mole percent, and water was present at 4.5 mole percent. It is possible that the results of Example 5 may vary by as much as +/−15%.

The following examples (Examples 6-10) were carried out using a reactor including an injector apparatus, as shown generally in FIG. 3.

Injector Apparatus

In the following examples, an automotive gasoline fuel injector (Delphi Automotive Company, Troy, Mich.) was attached to the top of a quartz reactor tube and used as the fuel delivery method to facilitate vaporization and mixing of reactants before contacting the catalyst. Pressurized feed at 20 pounds per squared inch (psig) read from a pressure gauge was fed into the injector, which was computer operated at frequency of about 10 Hertz (Hz) and at duty cycles, the percentage of time that the injector remains open, from about 3% to about 15%. Thus, the liquid flow rate delivered by the injector was controlled by the pressure in the fuel supply tank and by the duty cycle. The fuel delivery rate was calibrated at different pressures, frequencies, and duty cycles prior to conducting the following examples and was found accurate to within about ±0.05%.

Reactor

The reactor used in the following examples consisted of a quartz tube with a 19 millimeter (mm) inner diameter and was 45 centimeters (cm) in length. The feed gas was delivered to the reactor from the top, using an injector apparatus as described above, creating a film on the reactor walls. The oxygen source used, air, was separately delivered to the reactor from the top. The reactor walls were pre-heated to a temperature of between about 100 degrees Centigrade (° C.) and 160° C. The pre-heat temperature was at least about room temperature and no greater than about 200° C. Heating tape and insulation was provided around the reactor to prevent dissipation of heat. Blank monoliths were provided on either side of the catalyst to act as a heat shield. The back face temperature of the catalyst was measured with a thermocouple and the reaction products were recovered at the downstream side of the catalyst.

Oxygen Source

Air, rather than pure $O_2$, was used in the following examples to reduce the possibility of flames and explosions.

Reactor Temperatures

A significant variable in selecting an appropriate flow rate and C/O ratio of the reactants to produce the desired produce is the reactor temperature. Furthermore, processes of the present invention are preferably carried out under autothermal, nearly adiabatic operation, because with dilution in a furnace the temperatures will never be high enough to avoid coke formation, and high temperatures in the reactor before the catalyst typically will cause homogeneous combustion and soot formation. For the size of the monolith used in the present examples (approximately 1.8 centimeters (cm) diameter and 1 cm long) and with heat shields and insulation around the catalyst tube, the measured temperature at the exit of the catalyst was typically found to be within 100° C. of the calculated adiabatic temperature.

The feed gas used in the present examples was typically heated to a temperature high enough to provide a vapor, but not so high as to allow chemical reaction of the feed gas prior to contact with the catalyst.

Carbon to Oxygen Ratios

The present examples were carried out using C/O ratios in the combined feed gas and oxygen source (oxygen from any water present, however, is not counted in determining the C/O ratios) from the lowest C/O being about 0.5 to the highest C/O ratio being about 1.4 without any evident deterioration in performance over at least 30 hours. The lower limit, about 0.5, was set by the maximum temperatures that the catalyst was believed to be able to withstand without metal loss. Therefore C/O ratios of less than about 0.5 were seldom used. The upper C/O limit was selected according to the extinguishing of the autothermal reaction. That is, the reactor no longer operates under the conditions of the present invention when the C/O ratio exceeds about 1.4. The fuel flow rate and the C/O ratio used determine the reactor temperature, and low reactor temperatures it was found result in low conversion. Therefore, although the process performs at C/O ratios higher than about 1.4, high C/O ratio processes that extinguished the reaction were not preferred.

It was surprisingly found that carbon formation before and within the catalyst did not substantially shut down the present processes. It was anticipated that the catalyst would frequently become quenched as graphite is thermodynamically stable for the feed compounds used at all temperatures if C/O ratios are greater than 1, and graphite is predicted at equilibrium at lower temperatures, such as about 600° C., for C/O ratios less than 1.

Without being held to any particular theory, it is believed that the substantial absence of coking in the present processes is caused by the water formed in the reaction and that water typically removes carbon by steam reforming to CO. Oxygen is present in the first half, which is considered the upstream portion, of the catalyst, so any carbon on the surface is typically oxidized off. The presence of monolayer amounts of carbon in the second half, or downstream portion, of the catalyst, in the presence of a relatively poor concentration of oxygen, is believed to somewhat deactivate the rhodium surfaces. This slight deactivation is believed to prevent further side reactions which typically leads to additional coke formation.

Product Analysis

The reactor was allowed to run for about 30 minutes before a gas sample was taken. The sample was taken with a GASTIGHT syringe (available from Chrom Tech, Inc., Apple Valley, Minn.) and placed into a Hewlett Packard (Palo Alto, Calif.) model No. 5890 Gas Chromatograph (GC) for analysis. The GC had a 25 foot, 80/100 mesh packed Haysep D GC column (Alltech Associates, Deerfield, Ill.) and the carrier gas was helium.

The data from the GC was analyzed with the Hpchem software package that accompanies the HP 5890 Gas Chromatograph. The peak heights were converted to mole fraction using the nitrogen peak as a known reference.

Rhodium/cerium catalyst with a feed gas including ethanol.

Example 6

The catalyst used in this example was a rhodium/cerium coated alumina catalyst prepared as follows. Alfa Aesar #1263 rhodium nitrate solution (0.47 g), available from Alfa Aesar, Ward Hill, Mass.), and 0.2 g of cerium (III) nitrate hexahydrate (Aldrich Chemical Company, Milwaukee, Wis.) was mixed with 20 ml of deionized water and placed in a petrie dish. Then, an 80 pores per inch (PPI) alumnia monolith, available from ZUES Corporation (Kokomo, Ind.) weighing 2.627 g was placed in the petrie dish with the metal salt mixture, and the mixture was allowed to adsorb onto the monolith by capillary forces in the high surface area monolith. The water was then allowed to evaporate from the mixture for approximately 1 week. Once the water evaporated, the monolith was heated to about 500° C. in air for four hours. This provided a catalyst having rhodium and cerium each present in the catalyst in an amount of about 2.5 weight percent each, based on total weight of the catalyst metals.

The catalyst was placed in a reactor configured as described above. The reactor was maintained at atmospheric pressure throughout the process. Two blank 80 ppi ceramic foam monoliths (Vesuvius Hi-Tech Ceramics, Alfred Station, N.Y.) were placed immediately upstream (the region of the reactor between where the fuel and oxygen enter the reactor and the catalyst) and downstream from the catalyst. The blank monoliths acted as axial heat shields and were used to promote additional radial mixing. All three monoliths were wrapped with FIBERFRAX (Unifrax Corporation, PS3338, Niagara Falls, N.Y.) alumina-silica paper to avoid bypassing of gasses between the monoliths and the reactor wall. A chromel-alumel k-type thermocouple (Omega Engineering, Inc., Stamford, Conn.) was placed between the backside of the upstream blank monolith and the catalyst to measure the "back face" temperature. Alumina-silica insulation (Unifrax Corporation, Niagara Falls, N.Y.) was placed around the reactor to reduce radial heat loss.

Oxygen and nitrogen at the atomic ratio of approximately 3.76 $N_2$ to 1 $O_2$ were initially admitted to the reactor to heat the catalyst and walls. The flow rates of the oxygen source, high purity $N_2$ and $O_2$, entering the reactor from high-pressure cylinders were adjusted to approximately 4.451 standard liters per minute (SLPM) $N_2$ and approximately 1.183 SLPM $O_2$ using mass flow controllers that were accurate to about ±0.05 SLPM. The oxygen and nitrogen released heat to the catalyst, heating it to a temperature of about 175° C., measured at the back face of the catalyst using the thermocouple. The catalyst ignited within about 10 seconds.

Ethanol (Absolute 200 proof, Aaper Alcohol and Chemical Company, Shelbyville, Ky.) in a concentration of 100 weight percent, was then introduced with the fuel injector into the pre-heated section of the reactor as described above. The ethanol vaporized and mixed with the oxygen and nitrogen at a temperature of about 130° C. and at a C/O ratio of about 1 (atomic ratio of about 1:1 carbon to oxygen). The vaporized alcohol and oxygen mixture contacted the catalyst at a contact time of approximately 0.57 ms. The reaction was allowed to run for about 20 minutes, at which time the backface temperature of the catalyst stabilized at approximately 690° C., heated as a result of the exothermicity of the reaction.

A sample of the reaction product was then removed from the reactor using a 1,000 microliter syringe and analyzed as described above. The oxygen source was shut off, then the fuel source was shut off.

The reaction products obtained were 74% carbon monoxide, 13% carbon dioxide, 8.5% methane, 3.3% ethene, 1% acetaldehyde, 0.1% ethane, 0.1% ethylene, 67% hydrogen, and 23% water. Conversion of ethanol was about 88% and oxygen was about 100%, the values representing hydrogen atom or carbon atom selectivity.

Example 7

The process of Example 6 was followed, except that the alcohol composition comprised ethanol and water, with the ethanol present in a concentration of 75 mole percent and a flow rate of the oxygen source and the fuel source to provide 6 SLPM, the catalyst contact time was about 0.5 ms, and the catalyst back face temperature was about 775° C. The reaction products obtained were 60% carbon monoxide, 12% carbon dioxide, 12.1% methane, 12.7% ethane, 2.4% acetaldehyde, 0.5% ethane, 45% hydrogen, and 39% water. Conversion of ethanol was about 87% and conversion of oxygen was about 100%.

Example 8

The process of Example 6 was followed, except that the alcohol composition comprised ethanol and water, with the ethanol present in a concentration of 50 mole percent and a flow rate of the oxygen source and the fuel source to provide 6 SLPM, the catalyst contact time was 0.64 ms, and the catalyst back face temperature was about 550° C. The reaction products obtained were 55.9% carbon monoxide, 29% carbon dioxide, 14% methane, 0.6% ethane, 0.5% acetaldehyde, 77.8% hydrogen, and 6.5% water. Conversion of ethanol was about 95.3% and conversion of oxygen was about 100%.

Figure 6A:
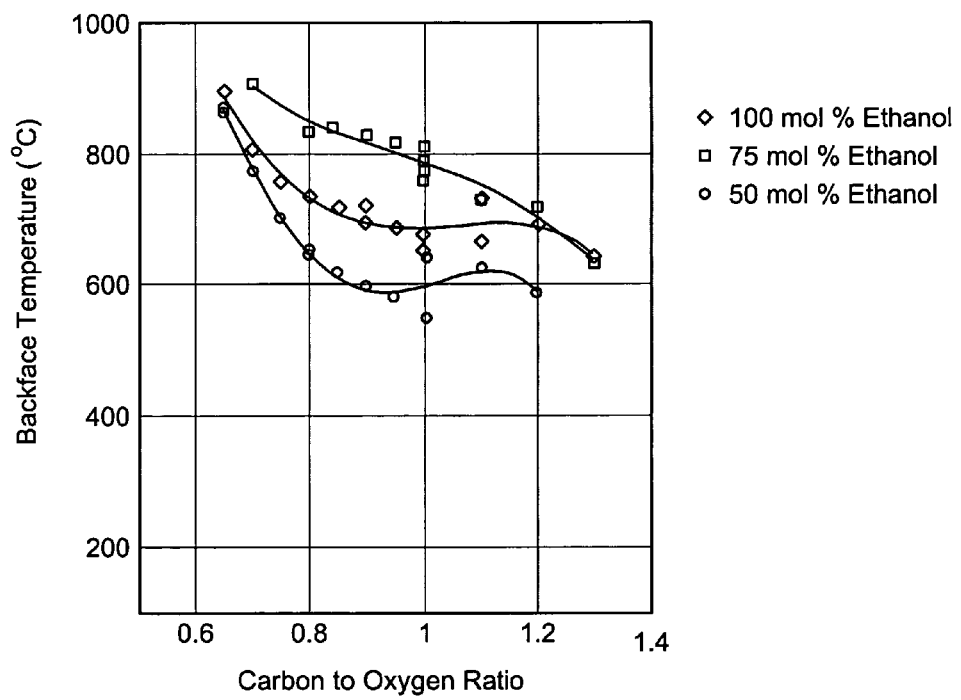
FIGS. 6(a) and 6(b)—Plots of the reaction with a rhodium/cerium catalyst at 6 SLPM of a feed gas including ethanol at concentrations of 100, 75 and 50 mole percent ethanol.
Figure 6B:
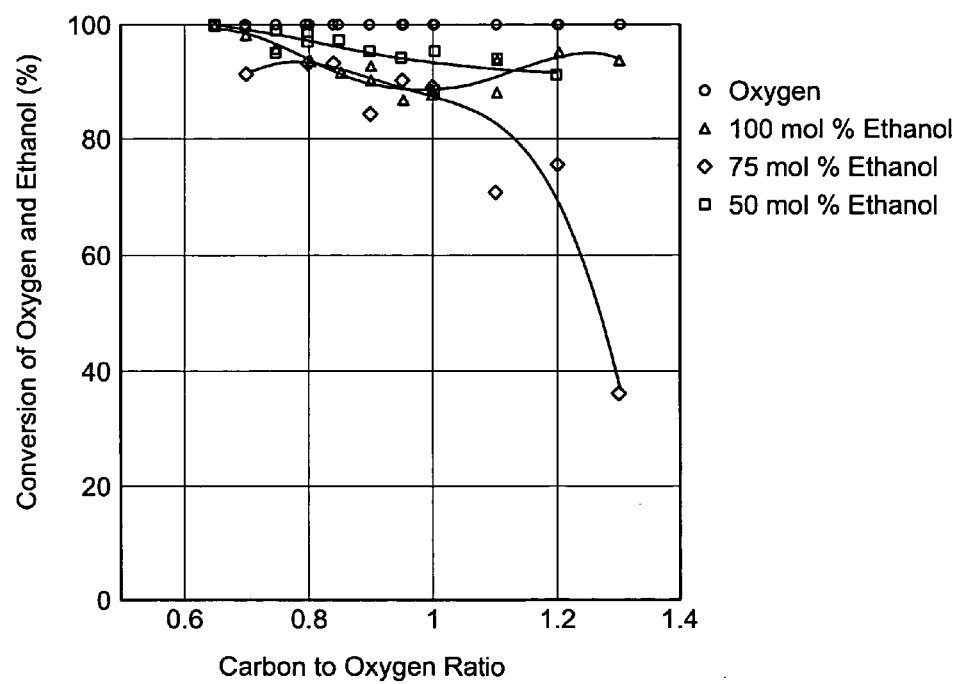

Each of Examples 6-8 were repeated at various catalyst backface temperatures and at flow rates and C/O ratios which together provided a SLPM of 6 for each experiment performed. The data was reported in the plots of FIGS. 6-8. FIG. 6(a) shows the backface temperature of the catalyst at the various C/O ratios. FIG. 6(b) shows the conversion of the three concentrations of ethanol studied (100 mole percent, 75 mole percent, and 50 mole percent) at the flow rates providing 6 SLPM. FIG. 6(b) further shows that substantially all of the oxygen is converted.

Figure 7A:
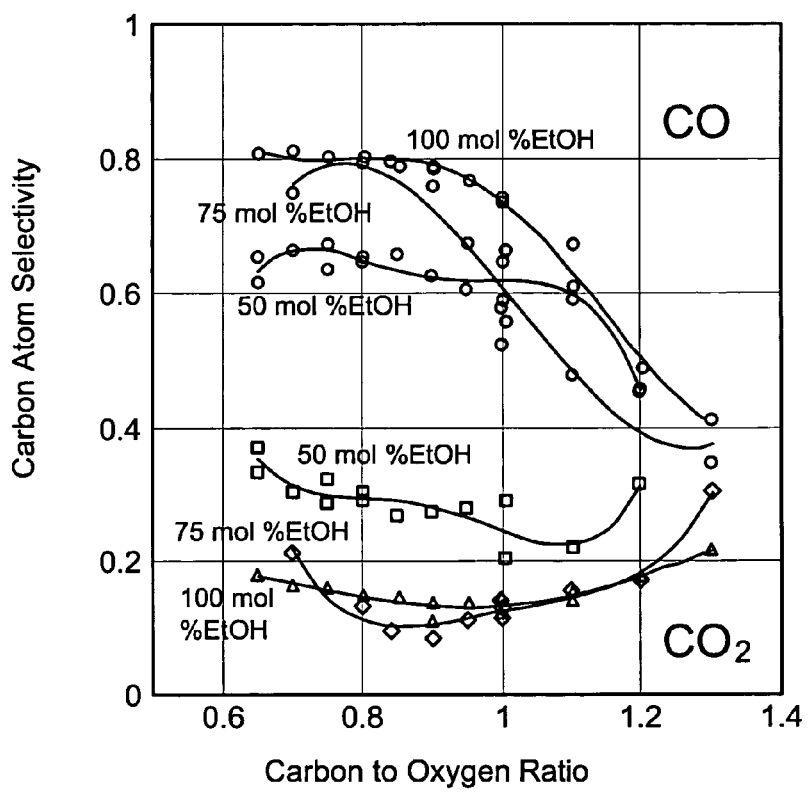
FIGS. 7(a) and 7(b)-Plots of the selectivities of the major products resulting from conversion of the feed gas, with ethanol concentrations of 100, 75 and 50 mole percent.
Figure 7B:
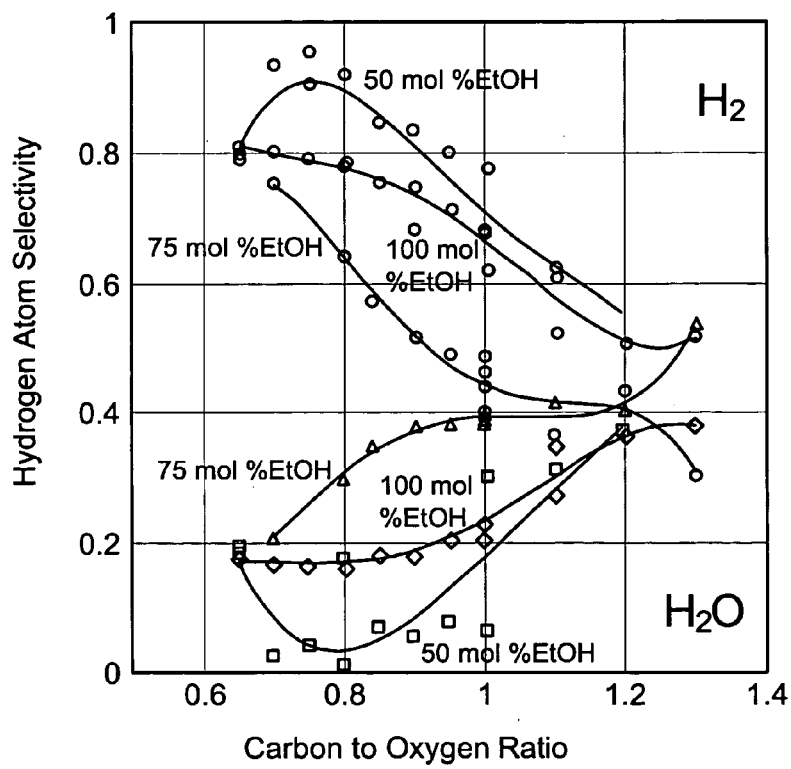

FIG. 7 shows the selectivities of the major products resulting from conversion of the feed gas, with ethanol concentrations of 100, 75 and 50 mole percent. The major products are CO, $CO_2$, $H_2$, and $H_2O$. FIG. 7(a) shows the selectivities to CO (top 3 lines of the plot) and to $CO_2$ (bottom 3 lines of the plot). FIG. 7(b) shows the selectivites to $H_2$ (top 3 lines of the plot) and $H_2O$ (bottom 3 lines of the plot). It was noted that as the water content of the feed gas increased, the selectivity to CO decreased and the selectivity to hydrogen increased at a given C/O ratio. Without being held to any particular theory, it is believed that this indicated that water-gas shift reactions occurred on the catalyst along with partial oxidation reactions.

Figure 8:
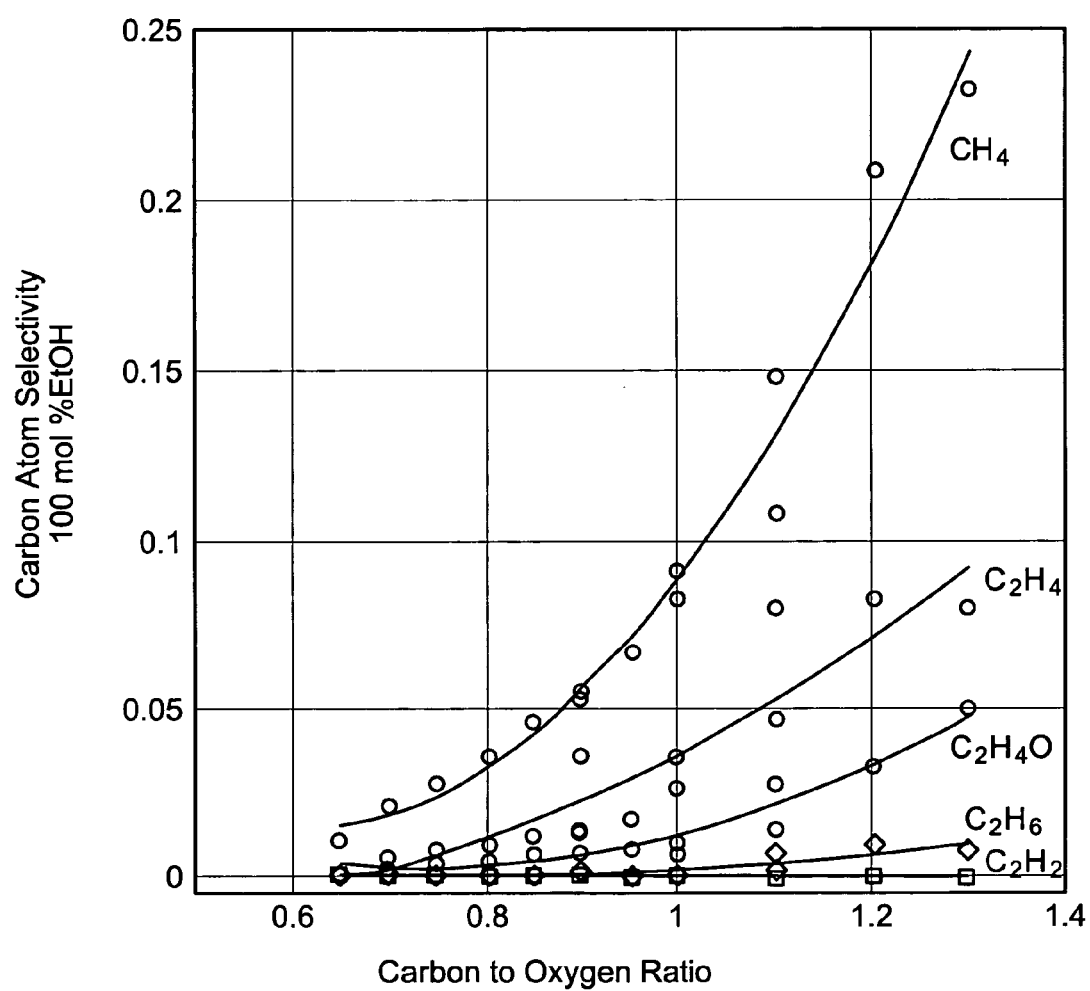
FIG. 8 Plots of the selectivities of the minor products for ethanol concentrations of 100 mole percent.

FIG. 8 shows the selectivities of the minor products for ethanol concentrations of 100 mole percent. The minor products observed were methane, ethene, acetaldehyde, ethane, and ethylene. It is believed that when a feed gas including a lower concentration of ethanol is used, a smaller amount of the minor products would be produced.

Examples 9 and 10 compare results obtained from a reaction with the use of a catalyst, as described above, and a reaction under the same conditions, but instead using a stratified catalyst.

Example 9

The process of Example 6 was followed, except that the alcohol composition comprised ethanol and water, with the ethanol present in a concentration of 25 mole percent and a flow rate of the oxygen source and the fuel source to provide 6 SLPM, the catalyst contact time was 0.74 ms, and the catalyst back face temperature was about 650° C.

The catalyst used in this example was a rhodium/cerium coated alumina catalyst prepared according to Example 6, with 0.47 g Alfa Aesar #1263 rhodium nitrate solution (Alfa Aesar, Ward Hill, Mass.), and 0.2 g cerium (III) nitrate hexahydrate (Aldrich Chemical Company, Milwaukee, Wis.) mixed with 20 ml of deionized water and adsorbed onto a 2.627 g, 80 ppi alumnia monolith, available from ZUES Corporation (Kokomo, Ind.). The rhodium and cerium were each present in an amount of about 2.5 weight percent each, based on total weight of the catalyst metals.

The reaction products obtained were 47.9% carbon monoxide, 51.9% carbon dioxide, 0.2% methane, 106.4% hydrogen, and −6.7% water. Conversion of ethanol was about 99.6% and conversion of oxygen was about 100%. A selectivity of over 100% hydrogen and a negative selectivity for water was obtained due to the fact that the selectivity was based on ethanol, and such calculations are understood in the art.

Example 10

The process of Example 9 was carried out, except that a stratified catalyst was used. The stratified catalyst included a rhodium/cerium catalyst, the rhodium and cerium about 2.5 weight percent each, based on total weight of the first portion catalyst, as the first portion, and a platinum/cerium catalyst, the platinum and cerium about 5 weight percent each, based on total weight of the second portion catalyst. A flow rate of the oxygen source and the fuel source provided 6 SLPM, the catalyst contact time was 0.78 ms, and the catalyst backface temperature was about 605° C.

The first portion of the stratified catalyst was a rhodium/cerium coated alumina catalyst prepared according to Example 6, with 0.47 g Alfa Aesar #1263 rhodium nitrate solution (Alfa Aesar, Ward Hill, Mass.), and 0.2 g cerium (III) nitrate hexahydrate (Aldrich Chemical Company, Milwaukee, Wis.) mixed with 20 ml of deionized water and adsorbed onto a 2.627 g, 80 ppi alumnia monolith, available from ZUES Corporation (Kokomo, Ind.).

The second portion of the stratified catalyst was a platinum/cerium coated alumina catalyst prepared according to the Catalyst Preparation method as described above, with a mixture of 1.994 g of 8 weight percent hydrogen hexachloroplatinante (IV) solution (Aldrich Chemical Company, Milwaukee, Wis.) and 0.496 g cerium (III) hexahydrate (Aldrich Chemical Company, Milwaukee, Wis.) mixed with 60 ml of deionized water and adsorbed onto a 6.384 g, 80 ppi alumnia monolith, available from ZUES Corporation (Kokomo, Ind.).

The reaction products obtained were 35.3% carbon monoxide, 64.4% carbon dioxide, 0.3% methane, 113% hydrogen, and −13.6% water. Conversion of ethanol was about 99.8% and conversion of oxygen was about 100%.

Figure 9A:
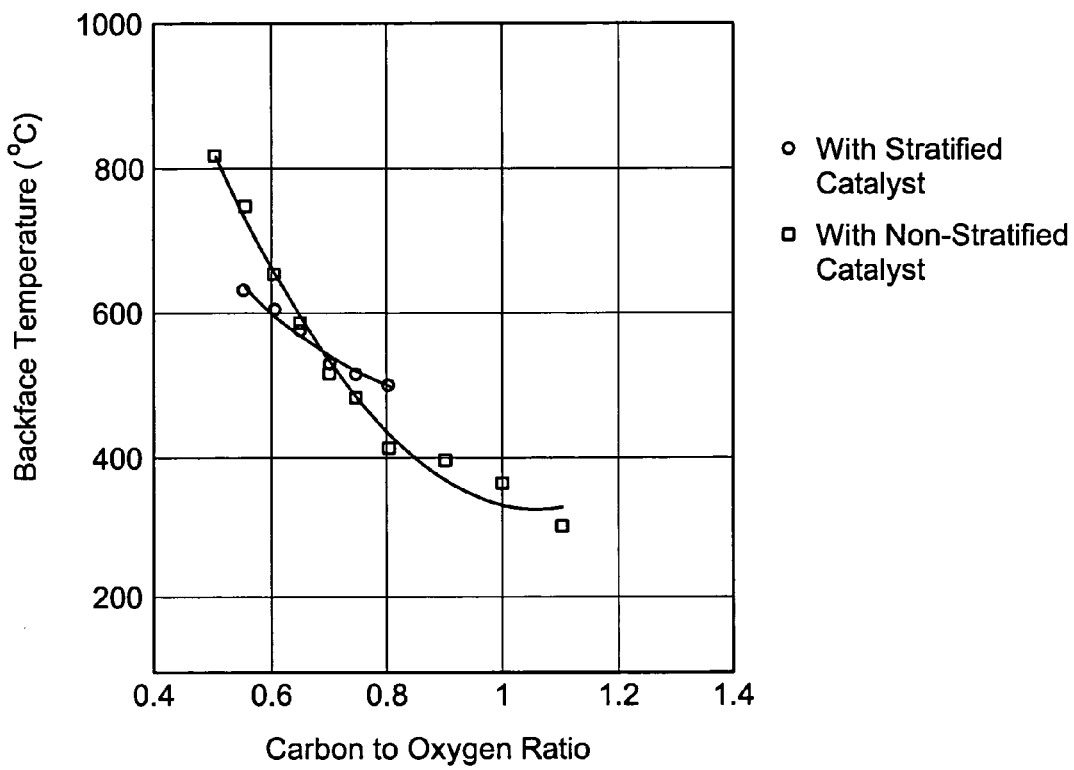
FIGS. 9(a) and 9(b)-FIG. 9(a) shows a plot of the backface temperature of reactions including a concentration of 25 mole percent ethanol and using both a "non-stratified" catalyst) and a stratified catalyst at the various C/O ratios.
Figure 9B:
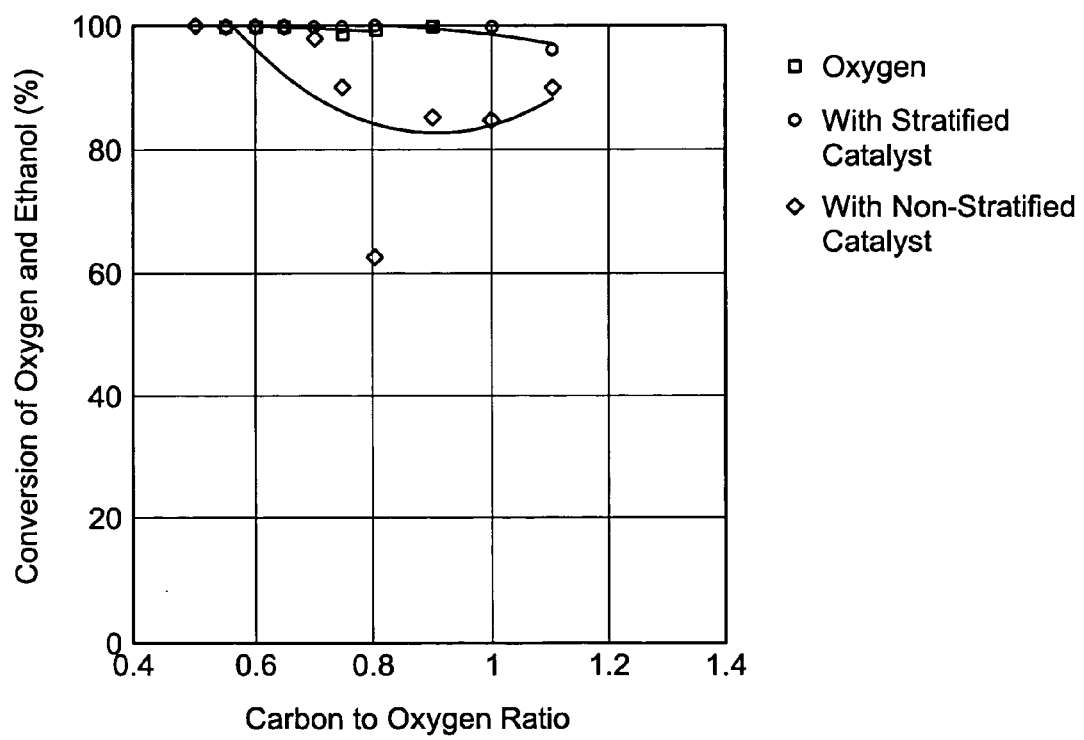

Each of Examples 9 and 10 were repeated at various catalyst backface temperatures and at flow rates and C/O ratios which together provided a SLPM of 6 for each experiment performed. The data was reported in the plots of FIGS. 9-11. FIG. 9($a$) shows the backface temperature of reactions using the catalyst of Example 9 (the "non-stratified" catalyst) and the stratified catalyst at the various C/O ratios. FIG. 9($b$) shows the conversion of ethanol and oxygen in reactions using the non-stratified and the stratified catalysts at the flow rates providing 6 SLPM. FIG. 9($b$) further shows that substantially all of the oxygen is converted and that the conversion of ethanol increases by using the stratified catalyst, as compared with the non-stratified catalyst.

Figure 10A:
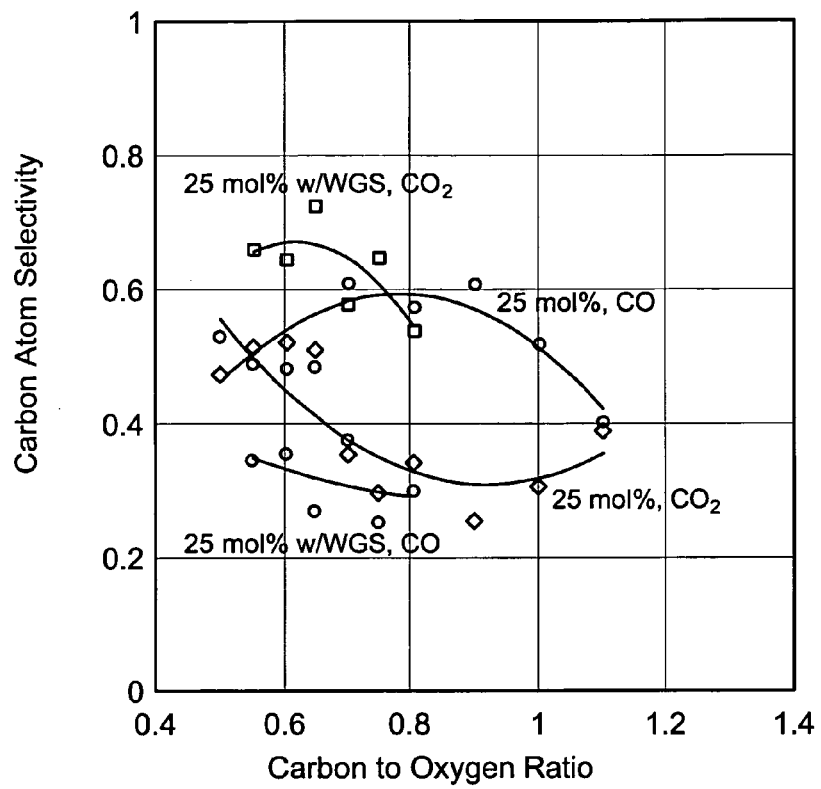
FIGS. 10(a) and 10(b)-Plots of the selectivities of the major products resulting from conversion of the feed gas, ethanol concentration of 25 mole percent, both with a stratified catalyst and with a non-stratified catalyst.
Figure 10B:
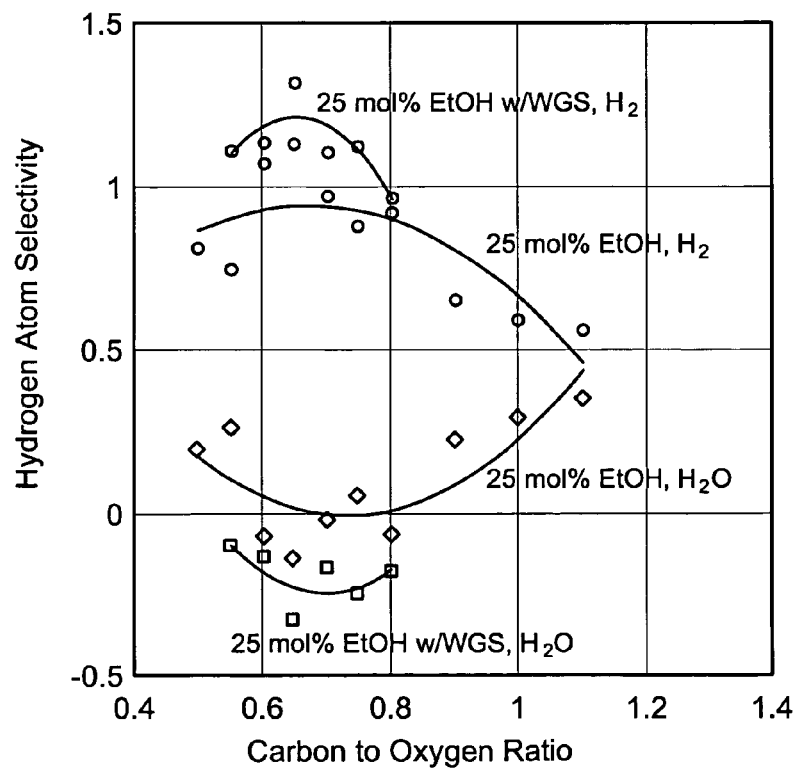

FIG. 10 shows the selectivities of the major products resulting from conversion of the feed gas of Examples 9 and 10, both with a stratified catalyst and with a non-stratified catalyst. The major products are CO, $CO_2$, $H_2$, and $H_2O$. FIG. 10($a$) shows the selectivities to CO and to $CO_2$. FIG. 10($b$) shows the selectivites to $H_2$ and $H_2O$.

Figure 11A:
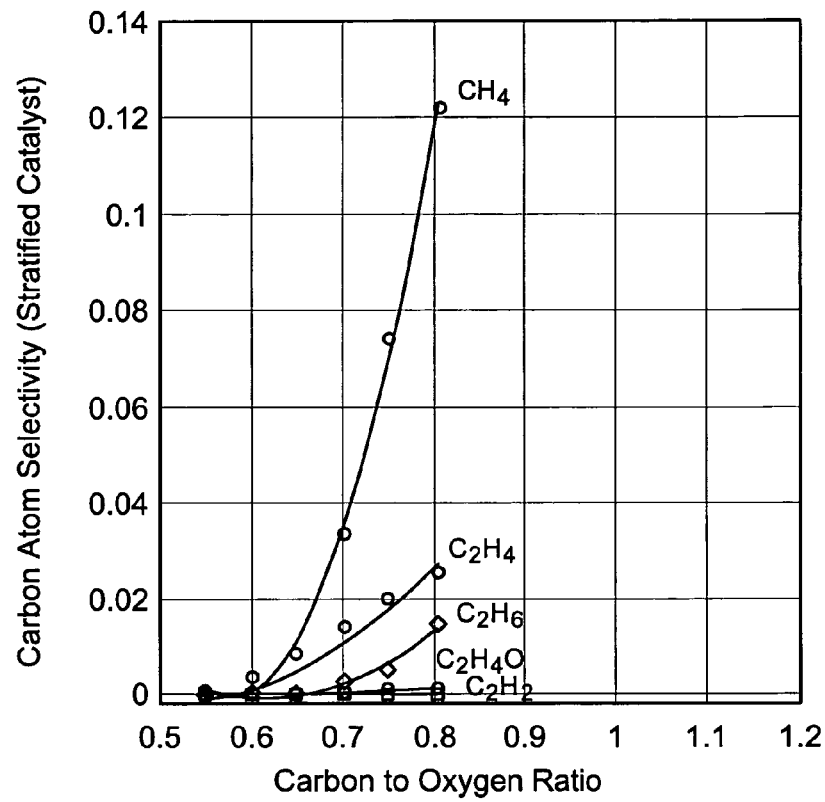
FIGS. 11(a) and 11(b)-Plots of the selectivities of the minor products for an ethanol feed gas, 25 mole percent ethanol, with a stratified catalyst and with a non-stratified catalyst.
Figure 11B:
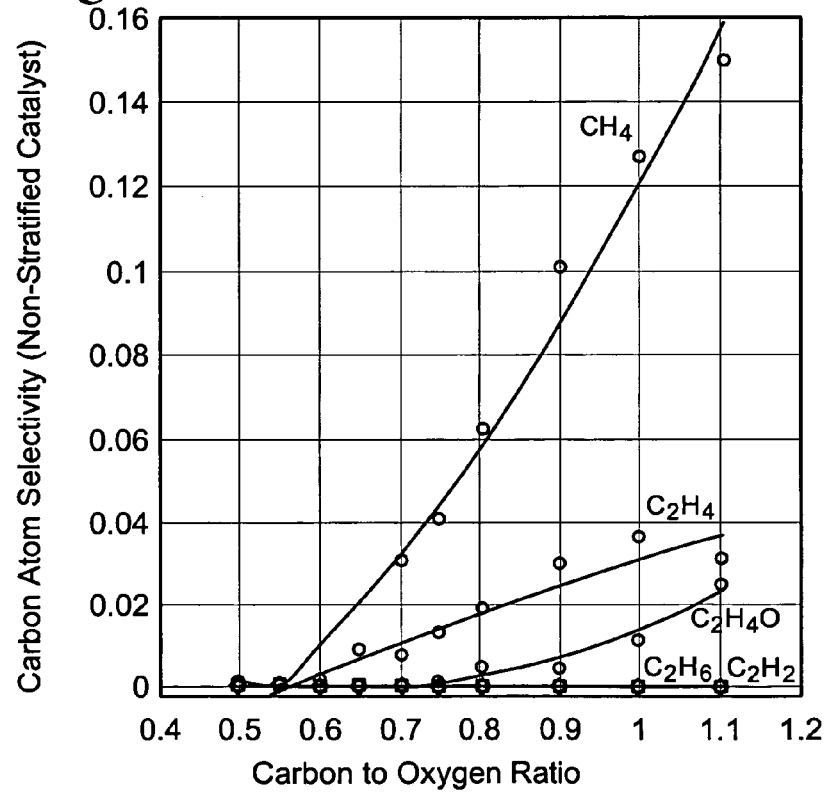

FIG. 11 shows the selectivities of the minor products for the ethanol feed gas of Examples 9 and 10. FIG. 11($a$) shows the selectivites for the minor products using a non-stratified catalyst. The minor products observed, in order of greatest to least concentration, were methane, ethene, ethane, acetaldehyde, and ethylene. FIG. 11($b$) shows the selectivites for the minor products using a stratified catalyst. The minor products observed, in order of greatest to least concentration, were methane, ethene, acetaldehyde, ethane, and ethylene. It is believed that the methane minor product increases more sharply with the stratified catalyst due to methanation (a reverse water-gas shift reaction). It is further believed that methanation may be reduced by selection of stratified catalyst and the use of an apparatus having a coaxial configuration to control the temperature.

The complete disclosure of any and all patents, patent documents, and publications cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

We claim:

1. A process for the production of hydrogen comprising forming a film of a composition comprising at least one alcohol comprising at least 2 carbon atoms on a wall of a reactor; vaporizing the composition; and contacting the composition with an oxygen-containing gas and a stratified catalyst under conditions effective to produce hydrogen.

2. The process of claim 1 wherein the alcohol is present in the composition in a concentration of at least about 75 weight percent, based on total weight of the composition.

3. The process of claim 1 wherein the alcohol is mixed with water.

4. The process of claim wherein the process is carried out under autothermal conditions.

5. The process of claim 1 wherein the alcohol is ethanol.

6. The process of claim 1 wherein the catalyst includes a backface, and further wherein the backface of the catalyst is at a temperature of at least about 300° C. after contact with the alcohol and oxygen-containing gas.

7. The process of claim 6 wherein the backface of the catalyst is at a temperature of no greater than about 1,400° C. after contact with the alcohol and oxygen-containing gas.

8. The process of claim 1 wherein the residence time of the alcohol and oxygen in contact with the catalyst is no greater than about 100 milliseconds.

9. The process of claim 1 wherein the catalyst comprises rhodium.

10. The process of claim 1 wherein the catalyst comprises rhodium metal, and/or oxide thereof, and at least one additional metal selected from the group of Groups 2, 3, 4, 5, 6, 7, 8, 9, 10, 11, 12, 13, and 14 of the Periodic Table, and combinations thereof.

11. The process of claim 10 wherein at least one metal is present in the form of an oxide.

12. The process of claim 10 wherein the additional metal comprises cerium.

13. The process of claim 1 wherein the alcohol and oxygen-containing gas are at a temperature of at least about 130° C. prior to contact with the catalyst.

14. The process of claim 13 wherein the alcohol and oxygen-containing gas are at a temperature of no greater than about 160° C. prior to contact with the catalyst.

15. The process of claim 1 wherein the catalyst comprises a support selected from the group consisting of metal monolith, metal foam, ceramic monolith, foam ceramic monolith, solid spheres, porous spheres, pellets, gauze, wires, plates, and combinations thereof.

16. The process of claim 1 having a gas hourly space velocity of at least about 10,000 $hr^{-1}$.

17. The process of claim 16 having a gas hourly space velocity of no greater than about 5,000,000 $hr^{-1}$.

18. A process for the production of hydrogen comprising:
providing a feed gas comprising at least one alcohol comprising at least 2 carbon atoms;
providing a catalyst having a backface;
forming a film of the feed gas on a wall of a reactor;
vaporizing the feed gas; and
contacting the feed gas with the catalyst under conditions effective to produce hydrogen;
wherein the backface of the catalyst is at a temperature of at least about 300° C. after contact with the alcohol, and wherein the feed gas is supplied at a temperature of no greater than about 160° C. prior to contact with the catalyst.

19. The process of claim 18 wherein the backface of the catalyst is at a temperature of no greater than about 1,400° C. after contact with the alcohol and the oxygen.

20. The process of claim 18 wherein the feed gas further comprises water.

21. The process of claim 18 wherein the alcohol is ethanol.

22. The process of claim 18 wherein the catalyst comprises rhodium metal, and/or oxide thereof, and at least one additional metal selected from the group of Groups 2, 3, 4, 5, 6, 7, 8, 9, 10, 11, 12, 13, and 14 of the Periodic Table, and combinations thereof.

23. The process of claim 22 wherein at least one metal is present in the form of an oxide.

24. The process of claim 22 wherein the additional metal is cerium.

25. The process of claim 18 wherein the gas hourly space velocity is at least about 10,000 hr$^{-1}$.

26. The process of claim 25 wherein the gas hourly space velocity is no greater than about 5,000,000 hr$^{-1}$.

27. A process for the production of hydrogen comprising:
providing a feed gas comprising at least one alcohol comprising at least 2 carbon atoms;
providing a catalyst;
forming a film of the feed gas on a wall of a reactor;
vaporizing the feed gas; and
contacting the feed gas with the catalyst under conditions effective to produce hydrogen;
wherein the residence time of the feed gas over the catalyst is no greater than about 100 milliseconds, and wherein the feed gas is supplied at a temperature of no greater than about 160° C. prior to contact with the catalyst.

28. The process of claim 27 wherein the feed gas further comprises water.

29. The process of claim 27 wherein the alcohol is ethanol.

30. The process of claim 27 wherein the catalyst comprises rhodium metal, and/or oxide thereof, and at least one additional metal selected from the group of Groups 2, 3, 4, 5, 6, 7, 8, 9, 10, 11, 12, 13, and 14 of the Periodic Table, and combinations thereof.

31. The process of claim 30 wherein at least one metal is present in the form of an oxide.

32. The process of claim 30 wherein the additional metal is cerium.

33. A process for the production of hydrogen comprising:
providing a feed gas comprising at least one alcohol comprising at least 2 carbon atoms;
providing a catalyst;
forming a film of the feed gas on a wall of a reactor;
vaporizing the feed gas; and
contacting the feed gas with the catalyst under conditions effective to produce hydrogen, wherein the feed gas is supplied at a temperature of no greater than about 160° C. prior to contact with the catalyst; and wherein the overall process occurs under autothermal conditions.

34. The process of claim 33 wherein the feed gas further comprises water.

35. The process of claim 33 wherein the alcohol is ethanol.

36. The process of claim 33 wherein the catalyst comprises rhodium metal, and/or oxide thereof, and at least one additional metal selected from the group of Groups 2, 3, 4, 5, 6, 7, 8, 9, 10, 11, 12, 13, and 14 of the Periodic Table, and combinations thereof.

37. The process of claim 36 wherein at least one metal is present in the form of an oxide.

38. The process of claim 36 wherein the additional metal is cerium.

39. A process for the production of hydrogen comprising:
providing a feed gas comprising at least one alcohol comprising at least 2 carbon atoms;
providing a stratified catalyst;
forming a film of the feed gas on a wall of a reactor;
vaporizing the feed gas; and
contacting the feed gas with the stratified catalyst under conditions effective to produce hydrogen;
wherein the stratified catalyst comprises at least one first portion and at least one second portion, wherein the first portion comprises at least one metal selected from the group consisting of Groups 2, 3, 4, 5, 6, 7, 8, 9, 10, 11, 12, 13, and 14 of the Periodic Table, oxides thereof, and combinations thereof, and the second portion comprises at least one metal selected from the group of Pd, Pt, Rh, Ir, Cu, Co, Zn, V, Ag, Ni, Ce, Zr, Y, Al, oxides thereof, and combinations thereof.

40. The process of claim 39 wherein at least one metal is present in the form of an oxide.

41. The process of claim 39 wherein the feed gas further comprises water.

42. The process of claim 39 wherein the alcohol is ethanol.

43. The process of claim 39 wherein the first portion of the stratified catalyst comprises rhodium metal, and/or oxide thereof, and the second portion of the stratified catalyst comprises a metal selected from the group consisting of Pd, Pt, Rh, Ir, Ce, Zr, Al, Y, oxides thereof, and combinations thereof.

44. The process of claim 43 wherein the second portion of the stratified catalyst comprises cerium, cerium oxide, or a combination thereof.

45. The process of claim 43 wherein the second portion of the stratified catalyst comprises platinum and cerium.

46. The process of claim 45 wherein the platinum and the cerium are each present in the stratified catalyst in an amount of 2.5 weight percent, based on total weight of the catalyst.

47. The process of claim 39 wherein the overall process takes place under autothermal conditions.

* * * * *